United States Patent
Hsu-Hung et al.

(10) Patent No.: US 10,346,059 B2
(45) Date of Patent: Jul. 9, 2019

(54) SYSTEM AND METHOD FOR SUPPORTING READ REQUESTS AND WRITE REQUESTS FOR DRIVES HAVING DIFFERENT SECTOR ALIGNMENTS WITHOUT A RAID

(71) Applicant: Dell Products, L.P., Round Rock, TX (US)

(72) Inventors: Damon Hsu-Hung, Sudbury, MA (US); Jeffrey L. Grummon, Milford, MA (US)

(73) Assignee: Dell Products, LP, Round Rock, TX (US)

( * ) Notice: Subject to any disclaimer, the term of this patent is extended or adjusted under 35 U.S.C. 154(b) by 239 days.

(21) Appl. No.: 14/054,627

(22) Filed: Oct. 15, 2013

(65) Prior Publication Data
US 2015/0106563 A1 Apr. 16, 2015

(51) Int. Cl.
G06F 3/06 (2006.01)
G06F 11/00 (2006.01)

(52) U.S. Cl.
CPC ............ *G06F 3/0614* (2013.01); *G06F 3/064* (2013.01); *G06F 3/0626* (2013.01); *G06F 3/0634* (2013.01); *G06F 3/0644* (2013.01); *G06F 3/0689* (2013.01); *G06F 11/00* (2013.01)

(58) Field of Classification Search
None
See application file for complete search history.

(56) References Cited

U.S. PATENT DOCUMENTS 7,574,558 B2    8/2009  Morley et al.
8,055,842 B1 *  11/2011 Iyer ............................. 711/114
8,380,926 B1 *  2/2013  Foley ................... G06F 11/1076 711/114
2006/0224823 A1 * 10/2006 Morley et al. ................ 711/113
2014/0201441 A1 * 7/2014  Rozmovits .......... G06F 11/2094 711/118

OTHER PUBLICATIONS

Hai Jin; Xinrong Zhou; Dan Feng; Sifa Zhang, "Improving partial stripe write performance in RAID level 5," Devices, Circuits and Systems, 1998. Proceedings of the 1998 Second IEEE International Caracas Conference on , vol., No., pp. 396,400, Mar. 2-4, 1998 URL: http://ieeexplore.ieee.org/stamp/stamp.jsp?tp=&arnumber=705871&isnumber=15252.*
Smith; Rod, Partitioning Advice, Jun. 26, 2011, Rods Books, http://www.rodsbooks.com/gdisk/advice.html.*
Mikalauskas; Aurimas, Aligning IO on a hard disk RAID—the Theory; Jun. 9, 2011, Percona, https://www.percona.com/blog/2011/06/09/aligning-io-on-a-hard-disk-raid-the-theory/.*
IBM, Virtual Disk, Mar. 16, 2017, Retrieved from: https://www.ibm.com/support/knowledgecenter/POWER8/p8ehl/apis/VirtualDisk.htm.*

* cited by examiner

*Primary Examiner* — Reginald G Bragdon
*Assistant Examiner* — Edward Wang
(74) *Attorney, Agent, or Firm* — Hamilton, Brook, Smith & Reynolds, P.C.

(57) ABSTRACT

In one embodiment, a method includes receiving an input/output (I/O) request for data that starts or ends at a location other than a physical sector boundary of the device. The method further includes reading, starting at a first physical sector boundary before a beginning location specified in the I/O request and ending at a second physical sector boundary after an ending location specified in the request.

20 Claims, 18 Drawing Sheets

SYSTEM AND METHOD FOR SUPPORTING READ REQUESTS AND WRITE REQUESTS FOR DRIVES HAVING DIFFERENT SECTOR ALIGNMENTS WITHOUT A RAID

BACKGROUND OF THE INVENTION

Drive vendors plan to end production of drives with 512-byte sectors in favor of drives with 4 kilobyte ("k," "kB," or "kByte") sectors. Benefits of drives with 4 k sectors are greater capacity and less overhead. A drawback of drives with 4 k sectors are that systems that use such drives, or the drives themselves, include or require redesign of methods and operations.

Definitions 512-byte sector—A 512-byte sector is, typically, a sector containing 512 bytes. However, a 512-byte sector can also apply to sectors that deviate slightly from 512 bytes (e.g., 520 bytes or 528 bytes), typically used in specialized systems. Even in such systems, the data stored in each sector is usually constrained to the standard 512 bytes, where the extra bytes store metadata.

4 k sector—A 4 k sector is, typically, a sector containing 4096 bytes. However, a 4 k byte sector can also apply to sectors that deviate slightly from 4096 bytes (e.g., 4104 or 4112 bytes).

512-native (512N) drive—A 512N drive is a legacy drive that has physical 512-byte sectors.

4 k-native (4 kN) drive—A 4 kN drive has physical 4 k sectors.

512-emulating (512E) drive—A 512E drive has physical 4 k sectors but advertises 512-byte sectors to a host through emulation. A 512E drive can also be called an "Advanced Format (AF)" drive.

Physical sector boundary scheme—A native sector boundary scheme of a physical drive determined by the physical sector size of the drive.

Internal sector boundary scheme—An abstract sector boundary scheme internally employed by a storage system determined by the internal sector size of the system.

Logical sector boundary scheme—A sector boundary scheme presented by a logical volume to its host determined by the logical sector size of the volume.

Virtualized sector boundary scheme—Either an internal or logical sector boundary scheme.

Aligned access—Any input/output (I/O) access that starts and ends on a physical sector boundary.

Unaligned access—Any input/output (I/O) access that does not start or end on a physical sector boundary, which can include any access that is smaller than a physical sector boundary.

Location—A data address on a drive specified in arbitrary units, such as bytes, rather than in units of sectors.

Emulation—Any method(s) that allow a device to accept I/O of a different sector boundary scheme than its native sector boundary scheme.

512-addressable volume—A 512-addressable volume is logical storage volume that advertises 512-byte sectors to the host.

4 k-addressable volume—A 4 k-addressable volume is a logical storage volume that advertises 4 k sectors to the host.

Parity—Parity here refers to any redundancy information appended to a series of data items. Generally, this refers to literal parity information associated with the data blocks in a RAID stripe. More generally, parity here refers to any symbol appended to a series of data symbols in a systematic erasure code. In particular, parity may refer to the contents of any of the redundancy units in a single RAID-6 or RAID-10 stripe, whether or not these units comprise literal parity information.

RAID—Generally, a "Redundant Array of Independent Drives." However, a person of ordinary skill in the art understands that the concepts of RAID, and by extension the methods disclosed here that refer to RAID, apply broadly to storage systems employing erasure codes (including parity or mirroring) and error-correcting codes for data protection. For example, systems that apply erasure codes for node redundancy may straightforwardly apply RAID concepts to nodes rather than drives, and a person of ordinary skill in the art can apply the methods disclosed here to such systems.

SUMMARY OF THE INVENTION

The discontinuation of 512N drives is expected to proceed on an aggressive schedule. This presents many problems for consumers of these drives.

The 512-byte sector has been the standard used by almost all general-purpose hard disk drives since 1956. Historically, only specialized systems are capable of using hard disk drives with any other sector size. Some existing systems could be modified to accommodate 4 kN drives, but the process may be fraught with expense, risk, and failure. Many other systems cannot be modified because they contain older components that that cannot accommodate 4 kN drives.

Notably, all Microsoft Operating Systems (OSes) up through Windows Server 2008 (Windows 7) currently do not and are not anticipated to support 4 kN drives. The first Microsoft OS to officially support 4 kN is Windows 8, available since September of 2012. Even then, Microsoft only specifies that the OS functions as specified, which does not imply 4 kN compatibility for any particular application running on the OS. Early anecdotal evidence finds that many applications do, in fact, encounter difficulties when presented with 4 kN drives, even applications that are generally thought to produce aligned I/O (such as databases).

This constitutes a vast base of machines with installed OSes and application software that are incompatible with 4 kN drives. Migration to 4 kN drives cannot occur until the existing systems running such software are either upgraded or phased out at end-of-life (EOL). This may be especially true of Virtual Machine (VM) deployments. A retailer, for example, may have many thousands of VM deployments, such as at cash registers, or at computer/processing nodes, all running incompatible OSes or applications.

Thus, solutions involving modification and migration are frequently unavailable or impractical. Consequently, emulation has arisen as a primary strategy to allow drives with 4 k sectors to be used by existing systems that accommodate only 512-byte sectors. The majority of 4 k-sector drives available today are 512e drives, which internally implement emulation methods to accept 512-byte I/O even though the underlying physical medium can only accept 4 k (aligned) I/O. However, drive-based emulation presents its own set of challenges.

Emulation carries unavoidable costs. Disk drives can only access an entire sector at a time, so accepting an unaligned write I/O incurs an expensive RAID read-modify-write operation. Many emulation strategies postpone this cost by collecting multiple unaligned I/Os and writing them out as full sectors in a staging area, but the RAID read-modify-write operation is still incurred when these writes are eventually destaged to their ultimate destination. The present invention neither postpones nor avoids these costs, but subsumes them within RAID operations that are already incurring read-modify-write overhead, thereby paying both costs with one action.

Emulation also carries unpredictable risks. The many emulation methods that may be employed by 512e drives may be varied, complex, evolving, and error-prone, which may necessitate burdensome testing with every new model or even new revision of 512e drives. Furthermore, drive vendors have committed to providing 512e drives only for a short time, regarding such technology as a short-term project to drive customers to become 4 k-friendly. The disclosed invention locates emulation within a storage array, rather than in the drives, reducing or avoiding these risks.

Embodiments of the present invention provide an emulation solution for the use of 4 kN drives to service unaligned I/O, and address the foregoing shortcomings.

As much as possible, supporting 4 kN drives should not impact the user experience. The user should be agnostic to the physical sector size employed unless the user requests this information. The present invention supports the use of 512N and 4 kN drives in the same RAID array, that is, the use of a plurality of physical sector boundary schemes simultaneously by dissociating the physical sector boundary scheme from the internal and logical sector boundary schemes.

Accordingly, this dissociation supports the configuration of logical storage volumes that advertise whatever logical sector boundary scheme the user chooses. Therefore, logical 512-addressable volumes can be offered forever, for those users who need it, regardless of future developments in physical sector size. Similarly, virtual 4 k-addressable volumes can be offered on any back-end hardware, e.g., allowing a user with legacy 512N drives to test-drive a logical volume with 4 k sectors or some other future sector size. Notably, a single logical volume may be hosted upon a cluster of systems wherein each system may have a different combination of physical sector boundary schemes.

Finally, servicing a single unaligned write in a RAID configuration requires a first read-modify-write to perform a partial sector update, and a second read-modify-write to perform a partial stripe update. However, the set of drives accessed in the first read-modify-write is a subset of the set of drives accessed in the second read-modify-write, while the set of bytes accessed in the second read-modify-write is a subset of the bytes accessed in the first read-modify-write. Therefore, it is possible to combine these two expensive operations into one. While existing solutions may perform two RAID read-modify-write operations (especially 512e drives), the present invention performs only one. The performance is equal to that of using RAID alone, almost completely hiding the cost of emulation.

In an embodiment, a method can include, responsive to a write request to a redundant array of independent drives (RAID) with a plurality of drives, determining a RAID operation to fulfill the write request, and further determining a plurality of data items required to complete the RAID operation. Each data item can include a data range on one of the plurality of drives. The data range specified in each data item may start or end at a location other than a physical sector boundary of the drive specified in the data item. The method can further include pre-reading at least one of the plurality of data items, starting at a first physical sector boundary at or before a beginning location specified in each corresponding data range and ending at a second physical sector boundary at or after an ending location specified in each corresponding data range. The method can further include performing a modify operation to generate new parity or mirror data based on data from the write request and data from the pre-reads, a modify operation to overlay data from the write request onto the data from the pre-reads, and/or a modify operation to overlay data from the parity calculation onto data from the pre-reads. The method can further include writing any data item containing data from the write request starting at the first physical sector boundary and ending at the second physical sector boundary. The plurality of disk drives can be enabled to have one or a plurality of physical sector sizes.

In an embodiment, the determined RAID operation can be at least one of an additive stripe update, a subtractive stripe update, and a mirrored stripe update. If the determined RAID operation is a mirrored stripe update, pre-reading can include selecting one of the plurality of data items to read.

In an embodiment, the method can include providing one or more logical volumes having one or more logical sector sizes. The disks in the RAID can be capable of having different physical sector sizes. The particular physical block boundary scheme can be at least one of 512 bytes and 4096 bytes, and the particular virtualized block boundary scheme is at least one of 512 bytes and 4096 bytes. An internal block boundary scheme can represent a common divisor of all of the physical sector sizes and all of the logical sector sizes. The common divisor can be the greatest common divisor.

In an embodiment, a logical volume can be hosted on one or more nodes. Each node can have a corresponding RAID. The physical sector sizes in a first of the nodes can be able to differ from the physical sector sizes in a second node. At least one of the nodes can include the RAID with the plurality of drives.

In another embodiment, the method further includes moving data having a logical address that maps to a first physical address from a first disk in the RAID to a second physical address on a second disk in the RAID having a second physical block boundary scheme or second virtualized block boundary scheme. The first disk can have a first physical block boundary scheme or first virtualized block boundary scheme. The method can further include mapping the logical address of data to the second physical address on the second disk.

In an embodiment, a system can include a request analysis module configured to, responsive to a write request to a redundant array of independent drives (RAID) with a plurality of drives, determine a RAID operation to fulfill the write request, and further determine a plurality of data items required to complete the RAID operation. Each data item can include a data range on one of the plurality of drives. The data range specified in each data item may start or end at a location other than a physical sector boundary of the drive specified in the data item. A drive reading module can be configured to pre-read at least one of the plurality of data items, starting at a first physical sector boundary at or before a beginning location specified in each corresponding data range and ending at a second physical sector boundary at or after an ending location specified in each corresponding data range. A modification module can be configured to perform a modify operation to generate new parity or mirror data based on data from the write request and data from the pre-reads, a modify operation to overlay data from the write request onto the data from the pre-reads, and/or a modify operation to overlay data from the parity calculation onto data from the pre-reads. A disk writing module can be configured to write any data item containing data from the write request starting at the first physical sector boundary and ending at the second physical sector boundary. The plurality of disk drives can be enabled to have one or a plurality of physical sector sizes.

In an embodiment, a non-transitory computer-readable medium can be configured to store instructions for supporting input/output (I/O) requests to drives with different physical block sizes. The instructions, when loaded and executed by a processor, can cause the processor to, responsive to a write request to a redundant array of independent drives (RAID) with a plurality of drives, determine a RAID operation to fulfill the write request, and further determine a plurality of data items required to complete the RAID operation. Each data item can include a data range on one of the plurality of drives. The data range specified in each data item can start or end at a location other than a physical sector boundary of the drive specified in the data item. The instructions can further cause the processor to pre-read at least one of the plurality of data items, starting at a first physical sector boundary at or before a beginning location specified in each corresponding data range and ending at a second physical sector boundary at or after an ending location specified in each corresponding data range. The instructions can further cause the processor to perform at least one of a modify operation to generate new parity or mirror data based on data from the write request and data from the pre-reads, a modify operation to overlay data from the write request onto the data from the pre-reads, and a modify operation to overlay data from the parity calculation onto data from the pre-reads. The instructions can further cause the processor to write any data item containing data from the write request starting at the first physical sector boundary and ending at the second physical sector boundary.

The plurality of disk drives can be enabled to have one or a plurality of physical sector sizes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1A:
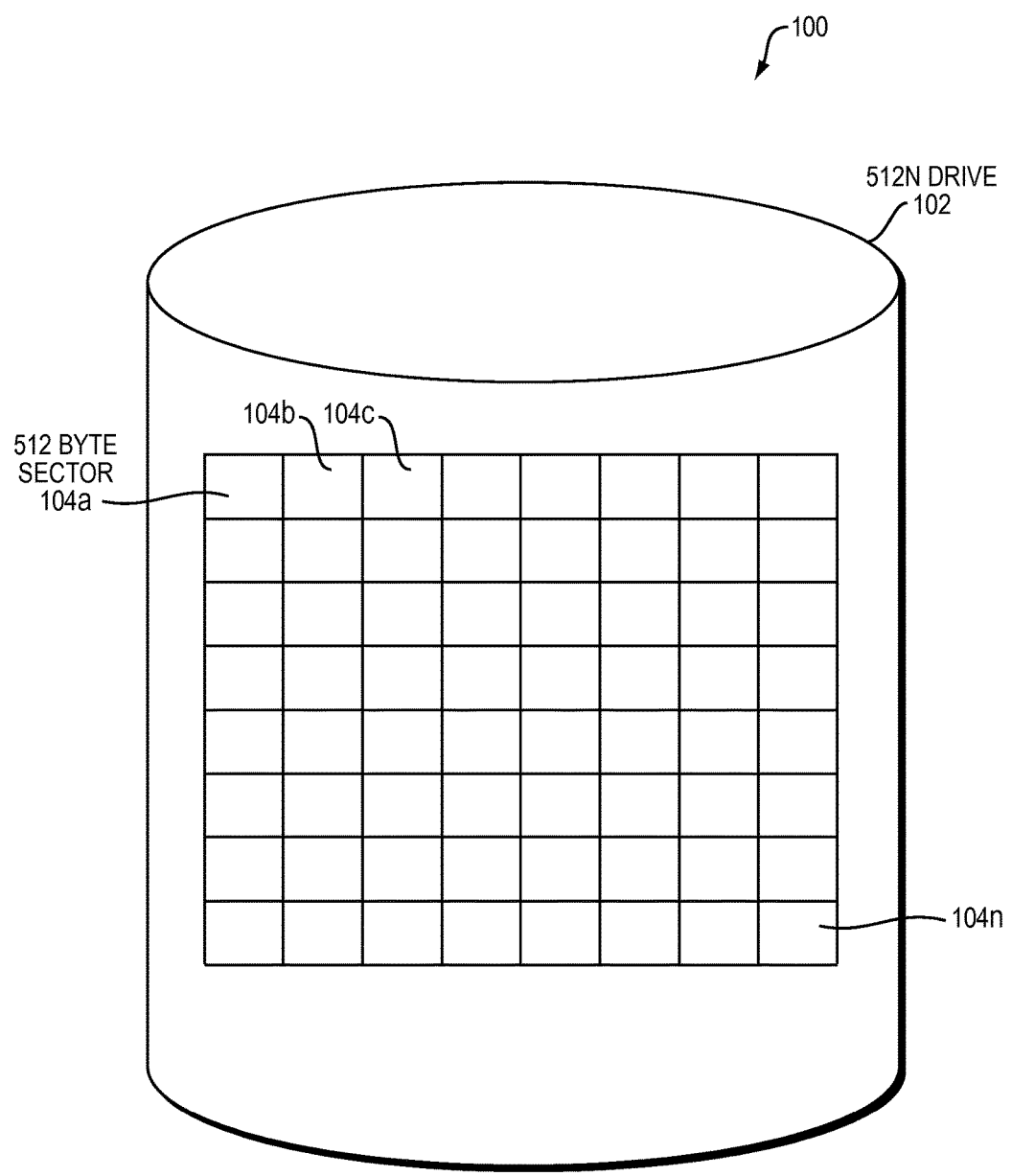
FIG. 1A is a block diagram illustrating an example embodiment of a 512N drive.

FIG. 1A is a block diagram 100 illustrating an example embodiment of a 512N drive 102. The 512N drive 102 includes a plurality of sectors 104. The plurality of sectors 104 are broken into 512-byte sectors 104a-n. The 512-byte sectors 104a-n can be of any quantity that fills the space of the 512N drive 102.

Figure 1B:
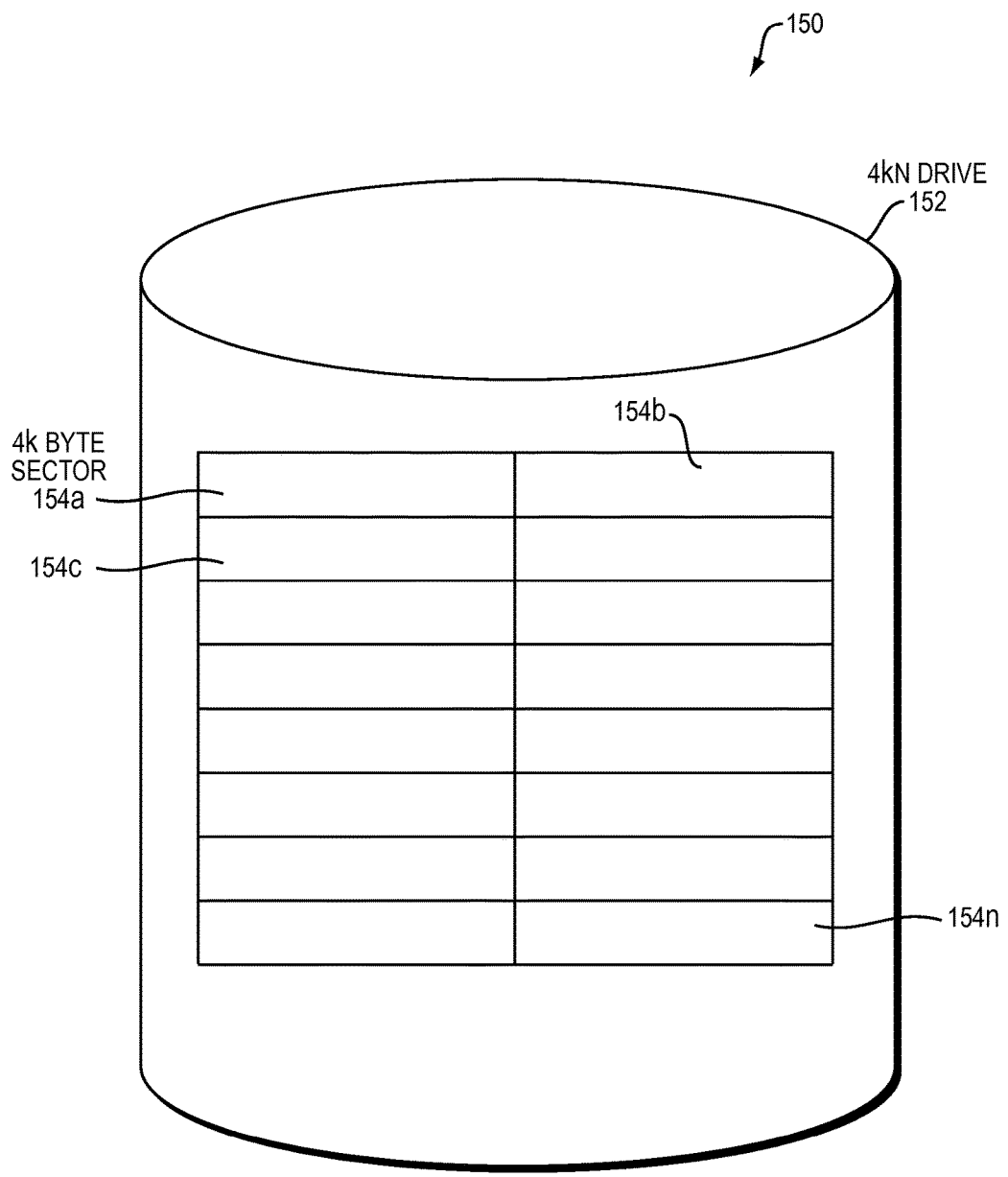
FIG. 1B is a block diagram illustrating an example embodiment of a 4 kN drive.

FIG. 1B is a block diagram 150 illustrating an example embodiment of a 4 kN drive 152. The 4 kN drive 152 includes a plurality of 4 kB sectors 154. The 4 kB sectors 154a-n can be of any quantity that fills up the 4 kN drive 152. A 4 kN drive 152 includes approximately eight times fewer sectors than an equally sized 512N drive because the 4 kN drive sectors are eight times bigger.

Figure 2A:
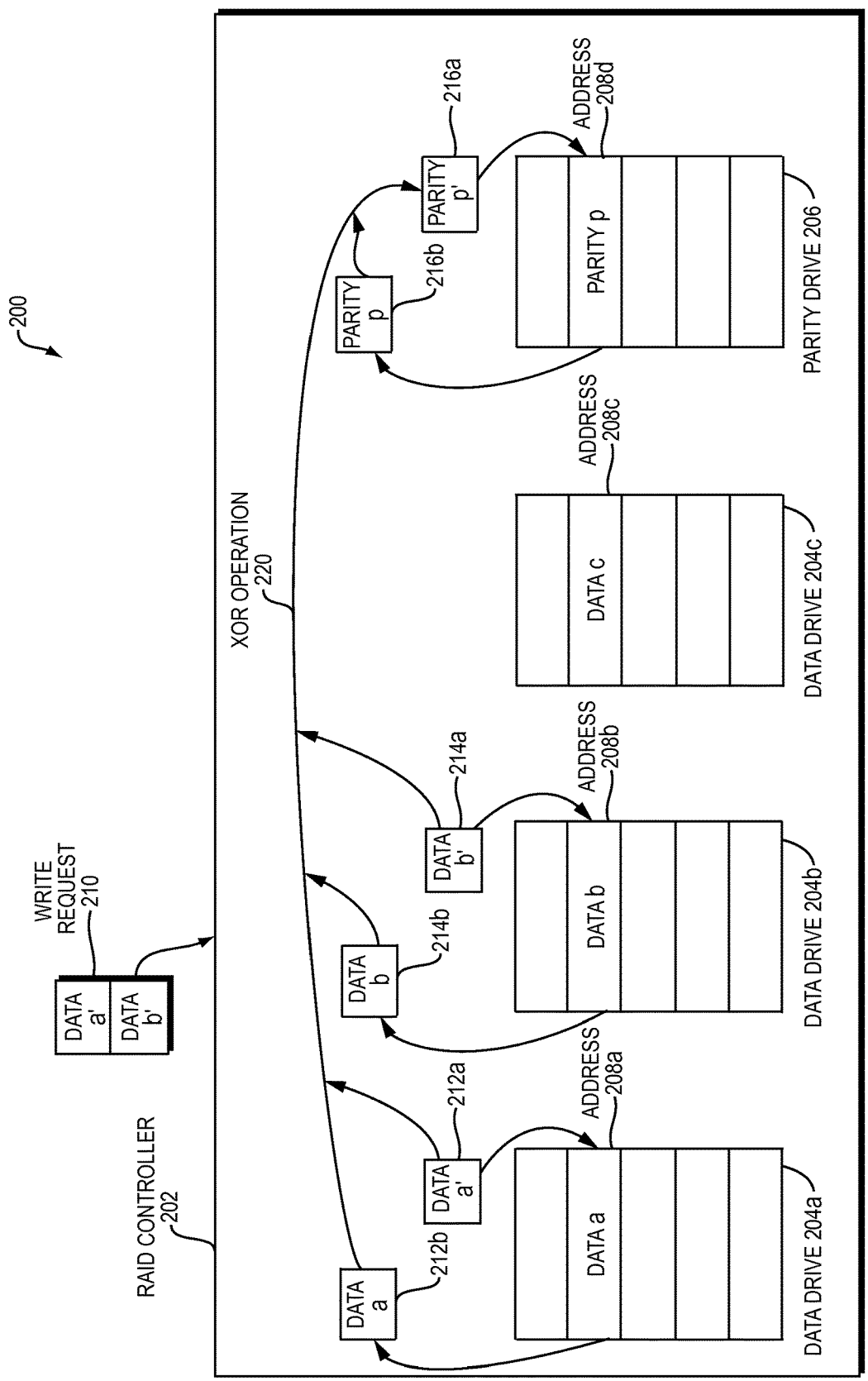
FIG. 2A is a block diagram illustrating an example embodiment of a RAID controller performing a subtractive RAID operation.

FIG. 2A is a block diagram 200 illustrating an example embodiment of a RAID controller 202 performing a subtractive RAID operation. A subtractive RAID operation is a type of read-modify-write operation well known by a person of ordinary skill in the art, characterized by pre-reading the data that is to be overwritten. The RAID comprises a controller 202, three data drives 204a-c, and a parity drive 206, representing a RAID-4 or RAID-5 configuration. The RAID controller 202 receives a write request 210 (e.g., an I/O request) containing new data (e.g., data a' and data b') to be written. The RAID controller 202 translates the logical address of the data specified in the request into physical addresses on physical drives, dividing the data as necessary. In this illustration, the RAID controller 202 determines that data a' of the write request 210 belongs to data drive 204a at physical address 208a, and separates it into buffer 212a. The RAID controller 202 also determines that data b' belongs to data drive 204b at physical address 208b, and separates it into buffer 214a. The RAID controller 202 then pre-reads the old data on data drives 204a-b, respectively, that is to be overwritten, placing data a from address 208a of data drive 204a into buffer 212b, data b from address 208b of data drive 204b into buffer 214b, and parity p from address 208d of parity drive 206 into buffer 216b. These data are then combined in XOR operation 220 to yield the updated parity p' in buffer 216a. Finally, the RAID controller 202 writes the data in buffers 212a, 214a, and 216a, containing the new data and the new parity, to their respective drives 204a-b and 206.

Figure 2B:
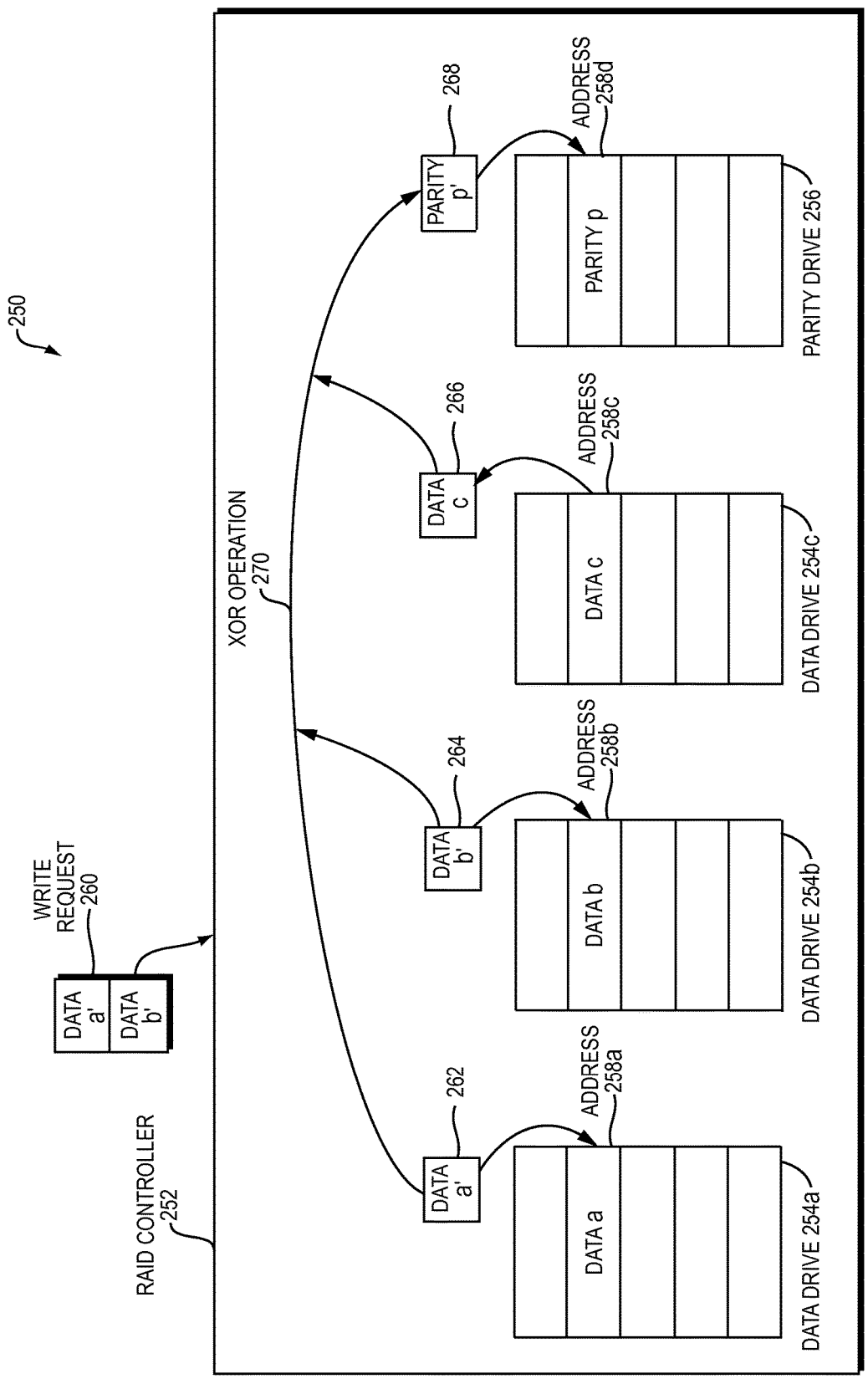
FIG. 2B is a block diagram illustrating an example embodiment of an RAID controller performing an additive RAID operation.

FIG. 2B is a block diagram 250 illustrating an example embodiment of an RAID controller 202 performing an additive RAID operation. An additive RAID operation is a type of read-modify-write operation well known by a person of ordinary skill in the art, characterized by pre-reading the data that is not to be overwritten. The RAID comprises a RAID controller 252, three data drives 254a-c, and a parity drive 256, representing a RAID-4 or RAID-5 configuration. The RAID controller 252 receives write request 260 containing new data (e.g., data a' and data b') to be written. The RAID controller 252 translates the logical address of the data specified in the request into physical addresses on physical drives, dividing the data as necessary. In FIG. 2B, the RAID controller 252 determines that data a' belongs to data drive 254a at physical address 258a, and separates it into buffer 262. The controller also determines that data b' belongs to data drive 254b at physical address 258b, and separates it into buffer 264. The controller then pre-reads additional data required for the update, namely data c on data drive 254c at address 258c and stores data c in buffer 266. Buffers 262, 264, and 266 are then combined in XOR operation 270 to yield the updated parity p' to be stored in buffer 268. Finally, buffers 262, 264, and 268, containing new data and new parity, are written to their respective drives 254a-b and 256.

Figure 3:
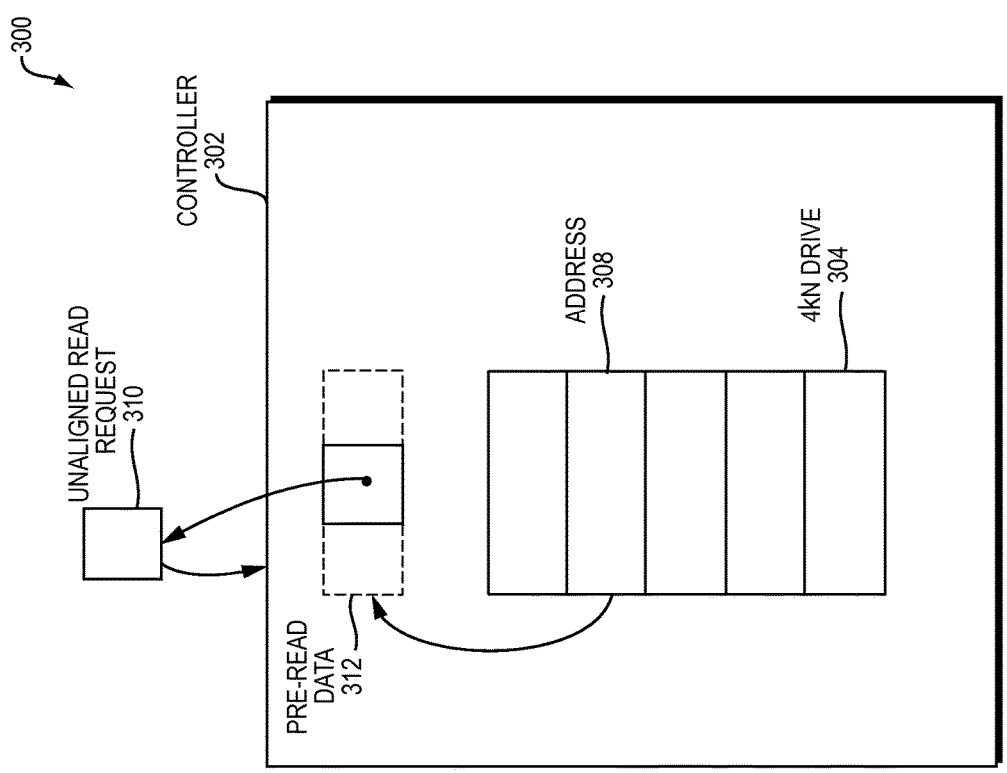
FIG. 3 is a block diagram illustrating an example embodiment of an unaligned sector read operation.

FIG. 3 is a block diagram 300 illustrating an example embodiment of an unaligned sector read operation. An unaligned sector read operation is well known by a person of ordinary skill in the art. An unaligned read request 310 is issued to a controller 302, which accepts the request despite its misalignment with the physical sector boundary scheme in 4 kN drive 304. The controller 302 determines a first physical sector boundary before a beginning location specified in the read request and a second physical sector boundary after an ending location specified in the request, and then pre-reads these sectors into a pre-read data buffer 312. When the 4 kN drive 304 completes this operation, the controller 302 responds to the unaligned read request 310 using the portion of the pre-read data buffer 312 corresponding to the actual beginning and ending locations specified in request 310.

Figure 4:
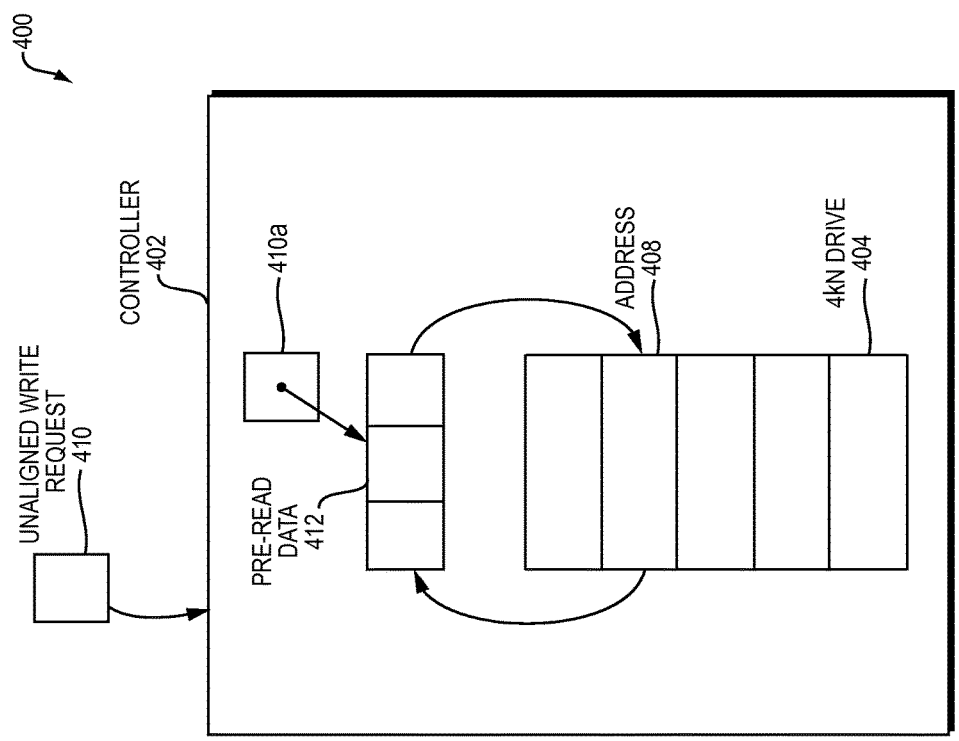
FIG. 4 is a block diagram illustrating an example embodiment of an unaligned sector read-modify-write operation.

FIG. 4 is a block diagram 400 illustrating an example embodiment of an unaligned sector read-modify-write operation. An unaligned sector read-modify-write operation is well known by a person of ordinary skill in the art. An unaligned write request 410 is issued to a controller 402, which accepts this request despite its misalignment with the physical sector boundary scheme in 4 kN drive 404. The controller 402 determines a first physical sector boundary before a beginning location specified in the write request and a second physical sector boundary after an ending location specified in the request, and then pre-reads these sectors into a pre-read data buffer 412. When the 4 kN drive 404 completes the pre-reads, the data 410a from write request 410 overwrites the portion of the pre-read data buffer 412 corresponding to the actual beginning and ending locations specified in write request 410. Finally, the modified pre-read data buffer 412 is written back to 4 kN drive 404, and the status of the operation is returned as the response to request 410.

Figure 5A:
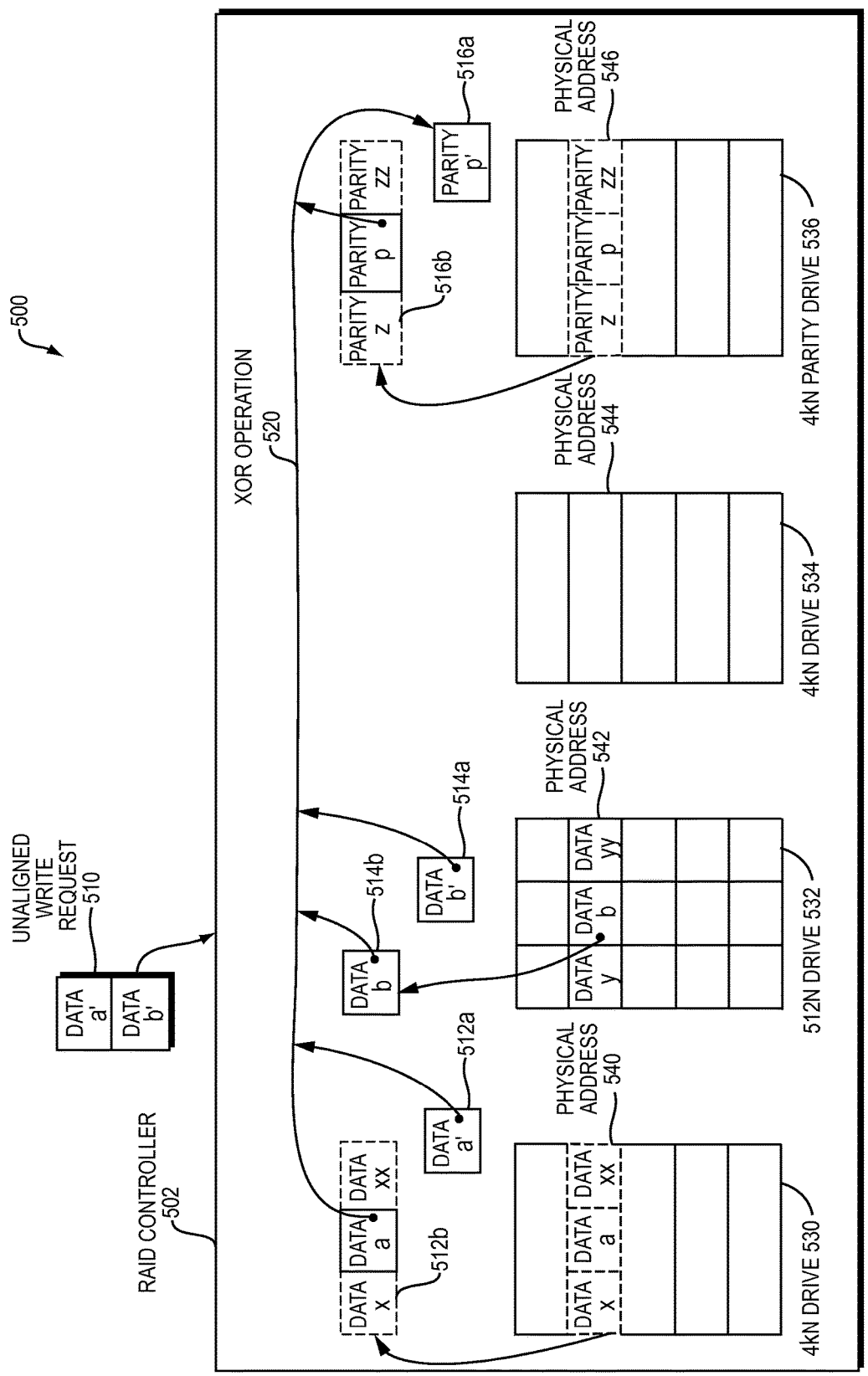
FIG. 5A is a block diagram illustrating an example embodiment of a subtractive RAID read-modify-write operation combined with an unaligned sector read-modify-write operation.

FIG. 5A is a block diagram 500 illustrating an example embodiment of a subtractive RAID read-modify-write operation combined with an unaligned sector read-modify-write operation. The RAID comprises a RAID controller 502, a first 4 kN data drive 530, a 512N data drive 532, a second 4 kN data drive 534, and a 4 kN parity drive 536, representing a RAID-4 or RAID-5 configuration. An unaligned write request 510 is issued to the RAID controller 502, which accepts the request despite its misalignment with the physical sector boundary scheme of at least one of the drives 530, 532, 534, and 536. As in FIG. 2, the RAID controller 502 determines that data a' belongs to 4 kN drive 530 at physical address 540, and separates it into buffer 512a. The RAID controller 502 also determines that data b' belongs to 512N drive 532 at physical address 542, and separates it into buffer 514a. The controller is then ready to pre-read the old data that is to be overwritten.

The RAID controller 502 determines a first physical sector boundary before the beginning of data a and a second physical sector boundary after the end of data a, and then pre-reads these sectors into buffer 512b because the location of data a is misaligned relative to the physical sector boundary scheme of 4 kN drive 530. Buffer 512b stores all of data a, along with data x and data xx, which are both not to be modified by the unaligned write request 510. The dotted lines of buffer 512b indicate that data x, data a, and data xx all reside within a single physical sector. In contrast, the location of data b is aligned relative to the physical sector boundary scheme of 512N drive 532, so the RAID controller 502 directly pre-reads data b from physical address 542 into buffer 514a. Finally, the location of parity p is misaligned relative to the physical sector boundary scheme of 4 kN parity drive 536, so the controller determines a physical sector boundary before the beginning of parity p and a second physical sector boundary after the end of parity p, and then pre-reads those sectors into buffer 516b. As before, buffer 516b contains all of parity p, along with parity z and parity zz, which are both not to be modified as a result of unaligned write request 510. These data are then combined in XOR operation 520 to yield the updated parity p' in buffer 516a.

Figure 5B:
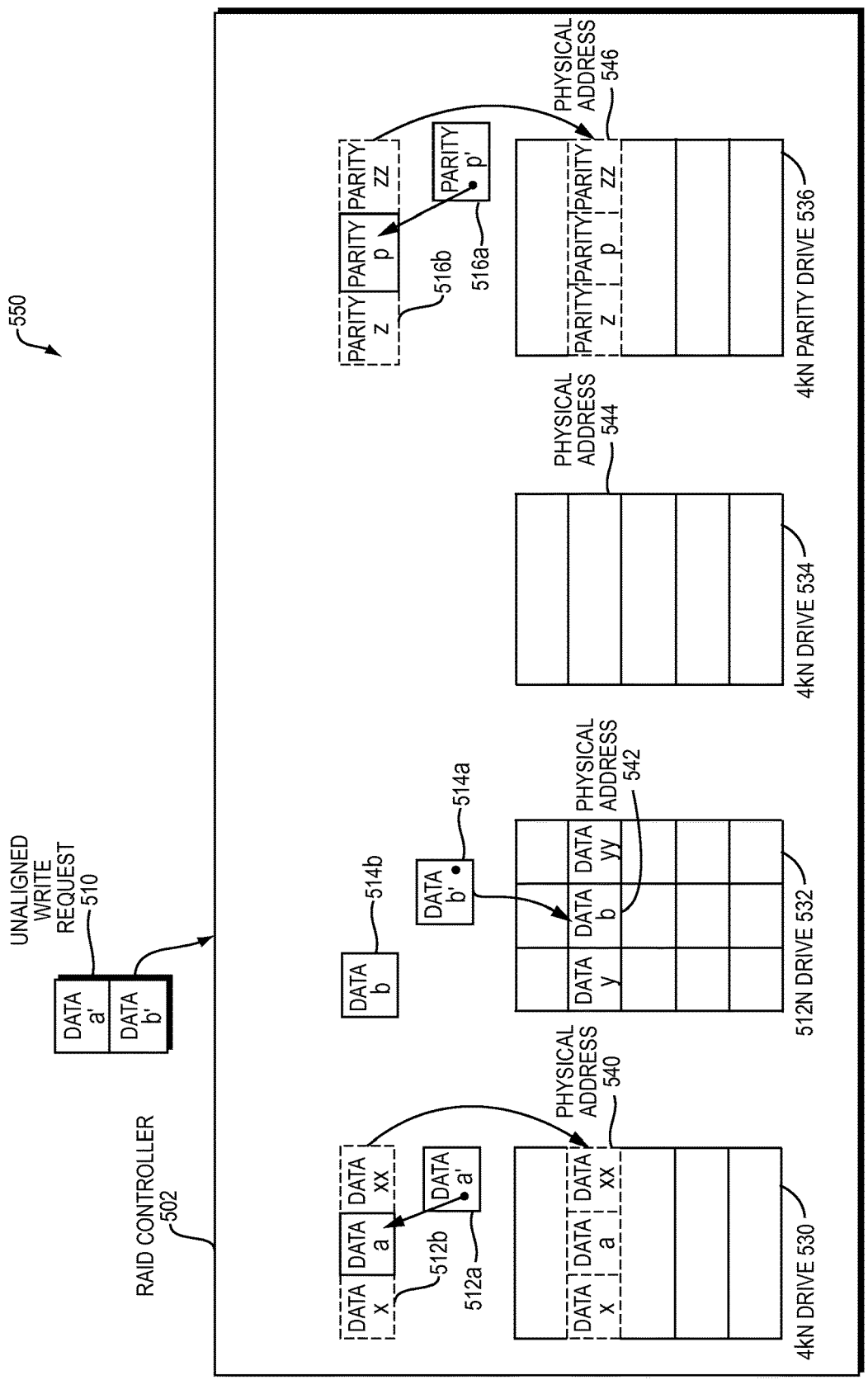
FIG. 5B is a block diagram further illustrating the example embodiment of a parity RAID read-modify-write operation combined with an unaligned sector read-modify-write operation.

FIG. 5B is a block diagram 550 further illustrating the example embodiment of a subtractive RAID read-modify-write operation combined with an unaligned sector read-modify-write operation. FIG. 5B is a logical continuation of the operation illustrated in FIG. 5A. In relation to FIG. 5B, the new data in buffer 512a overwrites the portion of buffer 512b corresponding to the actual beginning and ending locations of data a' in request 510. The new parity in buffer 516a overwrites the portion of buffer 516b corresponding to the actual beginning and ending locations of parity p'. Then buffer 512b is written to 4 Kn data drive 530 at physical address 540, buffer 514a is written to 512N drive 532 at physical address 542, and buffer 516b is written to 4 kN parity drive 536 at physical address 546.

Figure 5C:
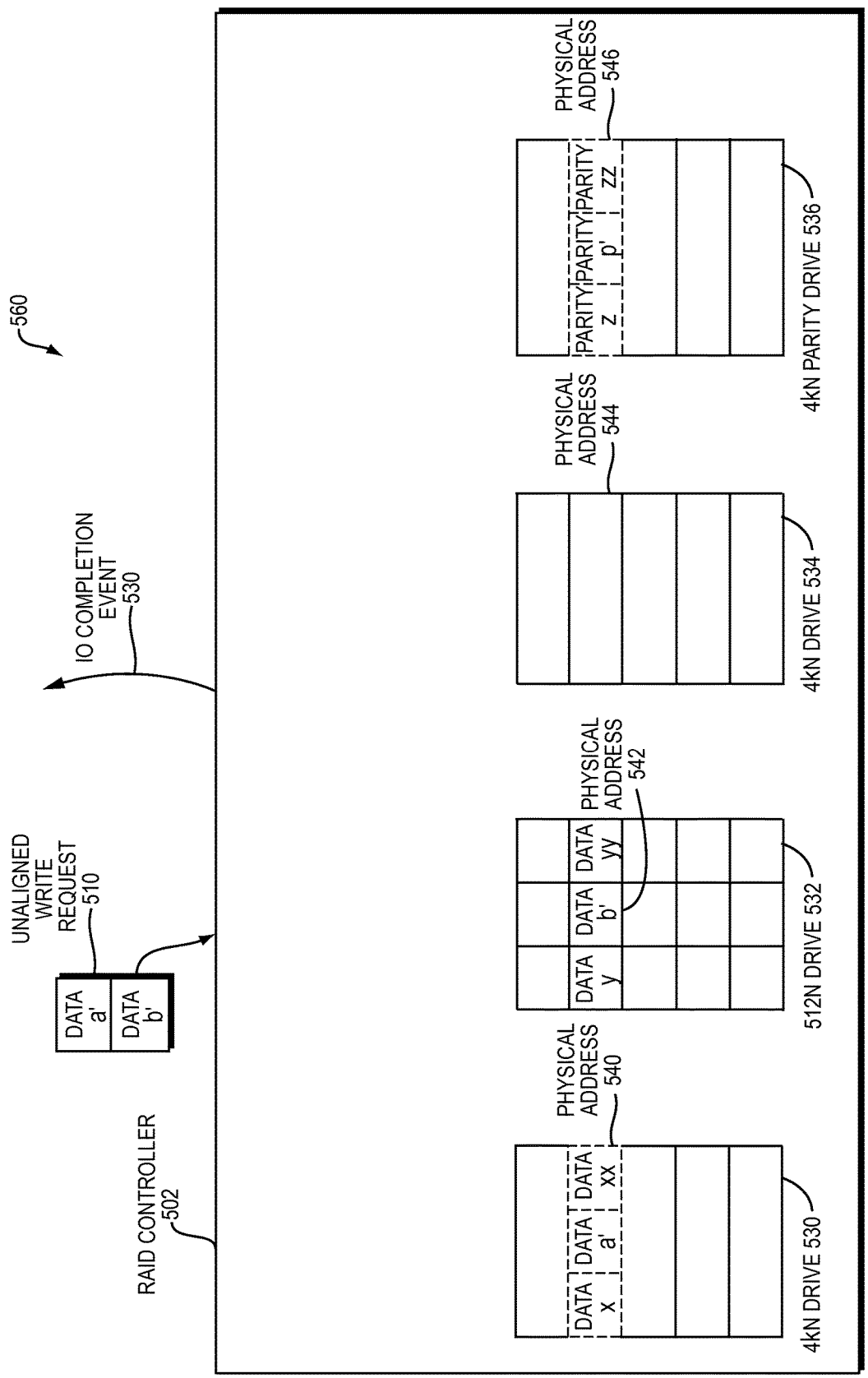
FIG. 5C is a block diagram illustrating the example embodiment of a parity RAID read-modify-write operation combined with an unaligned sector read-modify-write operation.

FIG. 5C is a block diagram 560 illustrating the example embodiment of a subtractive RAID read-modify-write operation combined with an unaligned sector read-modify-write operation. FIG. 5C is a logical continuation of the operation illustrated in FIGS. 5A-B. In relation to FIG. 5C, the RAID controller 502 generates a completion event 530 when the write operations of FIG. 5B have finished. Data a' has replaced data a without modifying data x or data xx on 4 kN drive 530, data b' has replaced data b directly on 512N drive 532, and parity p' has replaced parity p without modifying parity z or parity zz on 4 kN parity drive 536. Therefore, the sector read-modify-write and the RAID read-modify-write were accomplished in one combined operation.

Figure 6A:
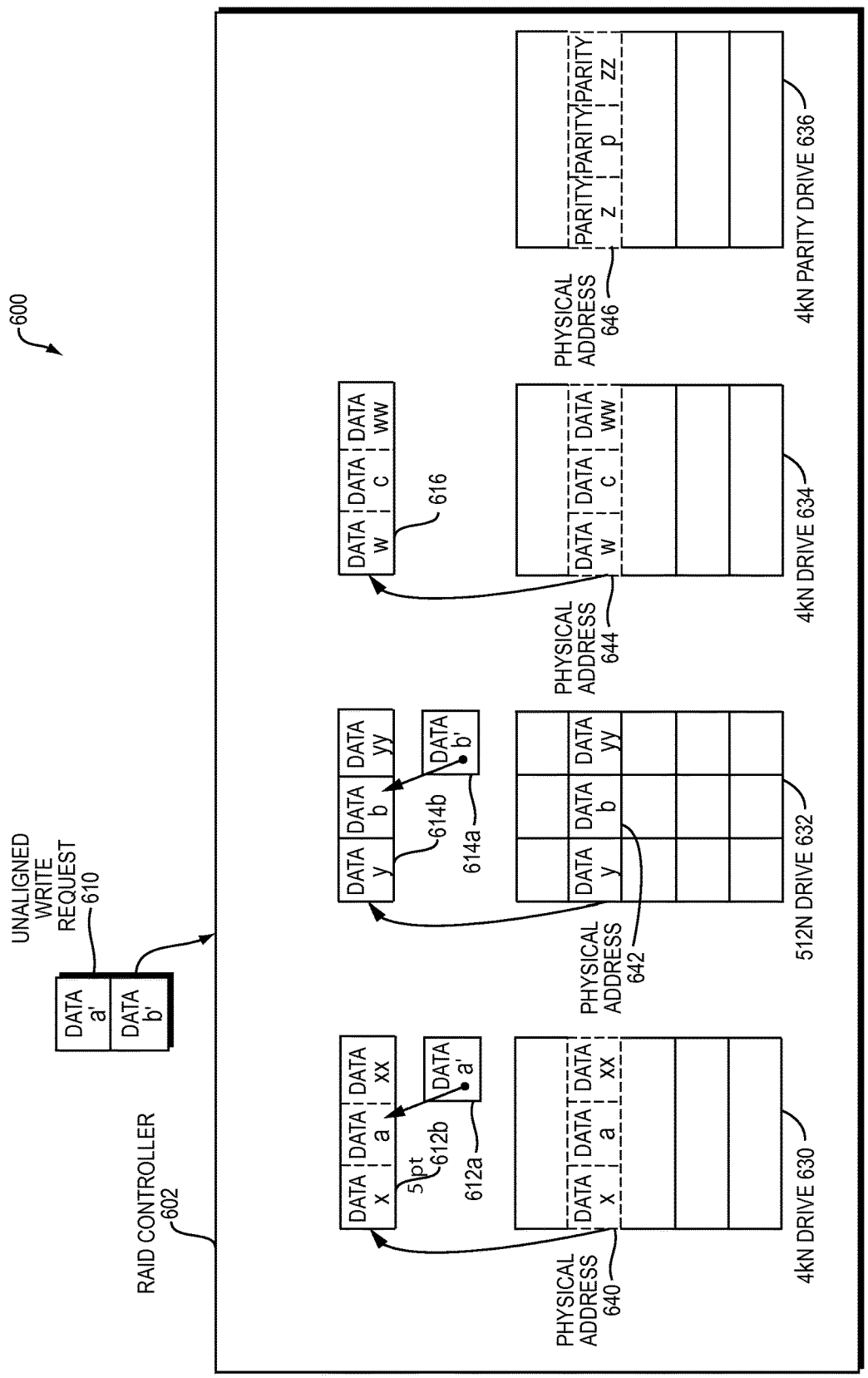
FIG. 6A is a block diagram 600 illustrating an example embodiment of an additive RAID read-modify-write operation combined with an unaligned sector read-modify-write operation.

FIG. 6A is a block diagram 600 illustrating an example embodiment of an additive RAID read-modify-write operation combined with an unaligned sector read-modify-write operation. The RAID comprises a RAID controller 602, a 4 kN data drive 630, a 512N data drive 632, a second 4 kN data drive 634, and a 4 kN parity drive 636, representing a RAID-4 or RAID-5 configuration. An unaligned write request 610 is issued to the RAID controller 602, which accepts this request despite its misalignment with the physical sector boundary scheme of at least one of the drives 630, 632, 634, and 636. As in FIG. 2A-B, the RAID controller 602 determines that data a' belongs to 4 kN data drive 630 at physical address 640, and separates it into buffer 612a. The controller also determines that data b' belongs to 512N data drive 632 at physical address 642, and separates it into buffer 614a. The RAID controller 602 is then ready to pre-read the data required to fulfill the write operation.

The RAID controller 602 determines a first physical sector boundary before the beginning of data a and a second physical sector boundary after the end of data a, and then pre-reads these sectors from physical address 640 into buffer 612b because the location of data a is misaligned relative to the physical sector boundary scheme of drive 630. Buffer 612b contains all of data a, along with data x and data xx, which are both not to be modified by the unaligned write request 610. The dotted lines of buffer 612b indicate that data x, data a, and data xx all reside within a single physical sector on 4 kN drive 630. In contrast, the location of data b is aligned relative to the physical sector boundary scheme of 512N data drive 632, but since an additive parity update uses parallel data items of the same size, the RAID controller 602 also determines a first physical sector boundary before the beginning of data b and a second physical sector boundary after the end of data b, corresponding to the boundaries determined for data a, and then pre-reads these sectors from physical address 642 into buffer 614b. Corresponding sectors from all remaining data drives are needed to complete the parity update, so the RAID controller 602 then pre-reads drive 634 at physical address 644 into buffer 616.

Finally, data a' in buffer 612a is overlaid upon the portion of buffer 612b corresponding to the actual beginning and ending locations of data a' in request 610, and data b' in buffer 614a is overlaid upon the portion of buffer 614b corresponding to the actual beginning and ending locations of data b' in request 610.

Figure 6B:
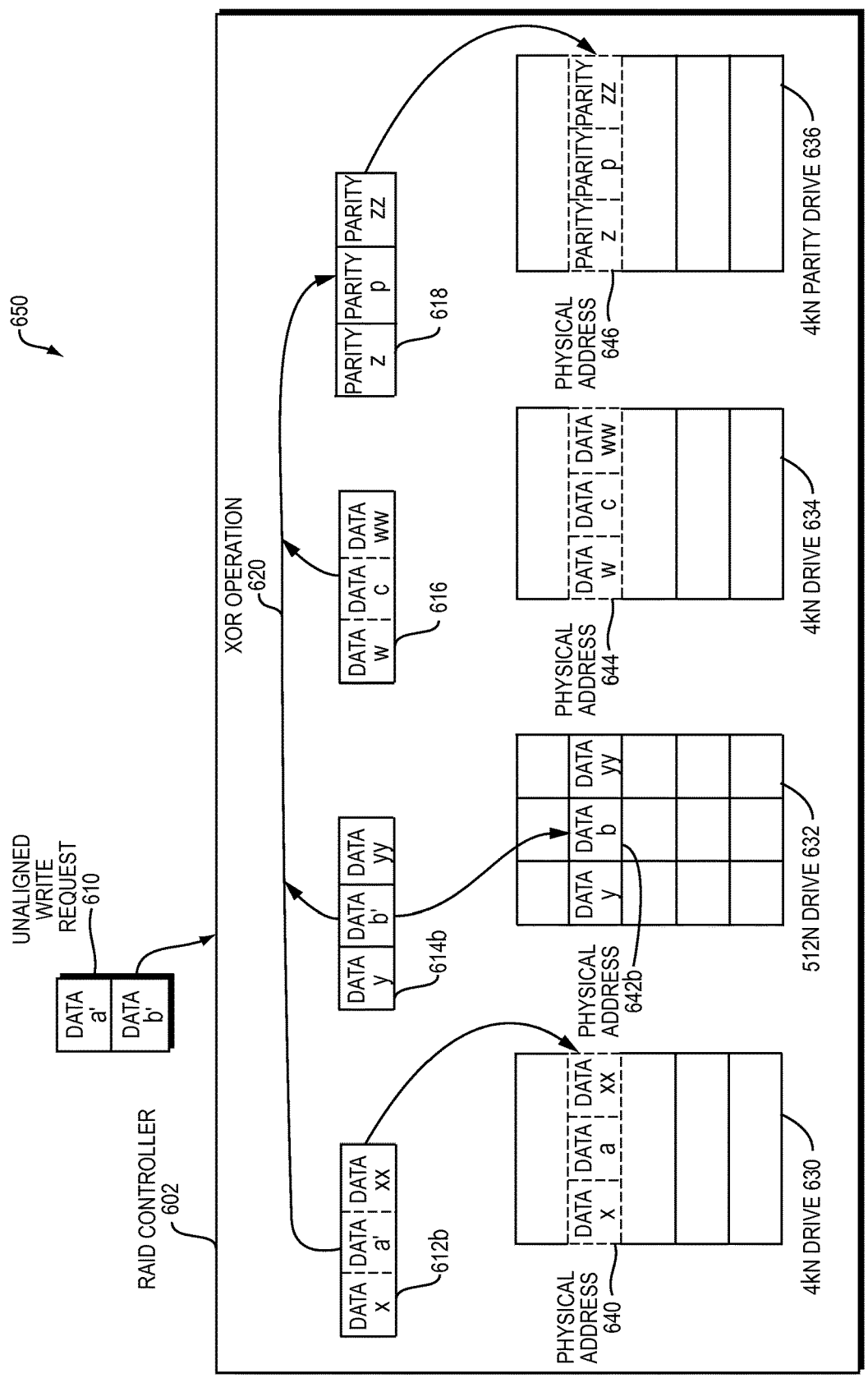
FIG. 6B is a block diagram illustrating an example embodiment of a parity RAID read-modify-write operation combined with an unaligned sector read-modify-write operation.

FIG. 6B is a block diagram 650 illustrating an example embodiment of an additive RAID read-modify-write operation combined with an unaligned sector read-modify-write operation. FIG. 6B is a logical continuation of the operation illustrated in FIG. 6A. In relation to FIG. 6B, buffer 612b contains new data a' and unmodified data x and xx, while buffer 614b contains new data b' and unmodified data y and yy. Buffers 612b, 614b, and 616 are combined in XOR operation 620 to produce buffer 618, thereby generating new parity p' and regenerating unmodified parity z and zz. Buffer 612b is written to drive 630 at physical address 640, and buffer 618 is written to drive 636 at physical address 646. However, because the modified portion of buffer 614b is aligned relative to the physical sector boundary scheme of 512N data drive 632, only the modified portion is written to 512N data drive 632 at physical address 642b.

Figure 6C:
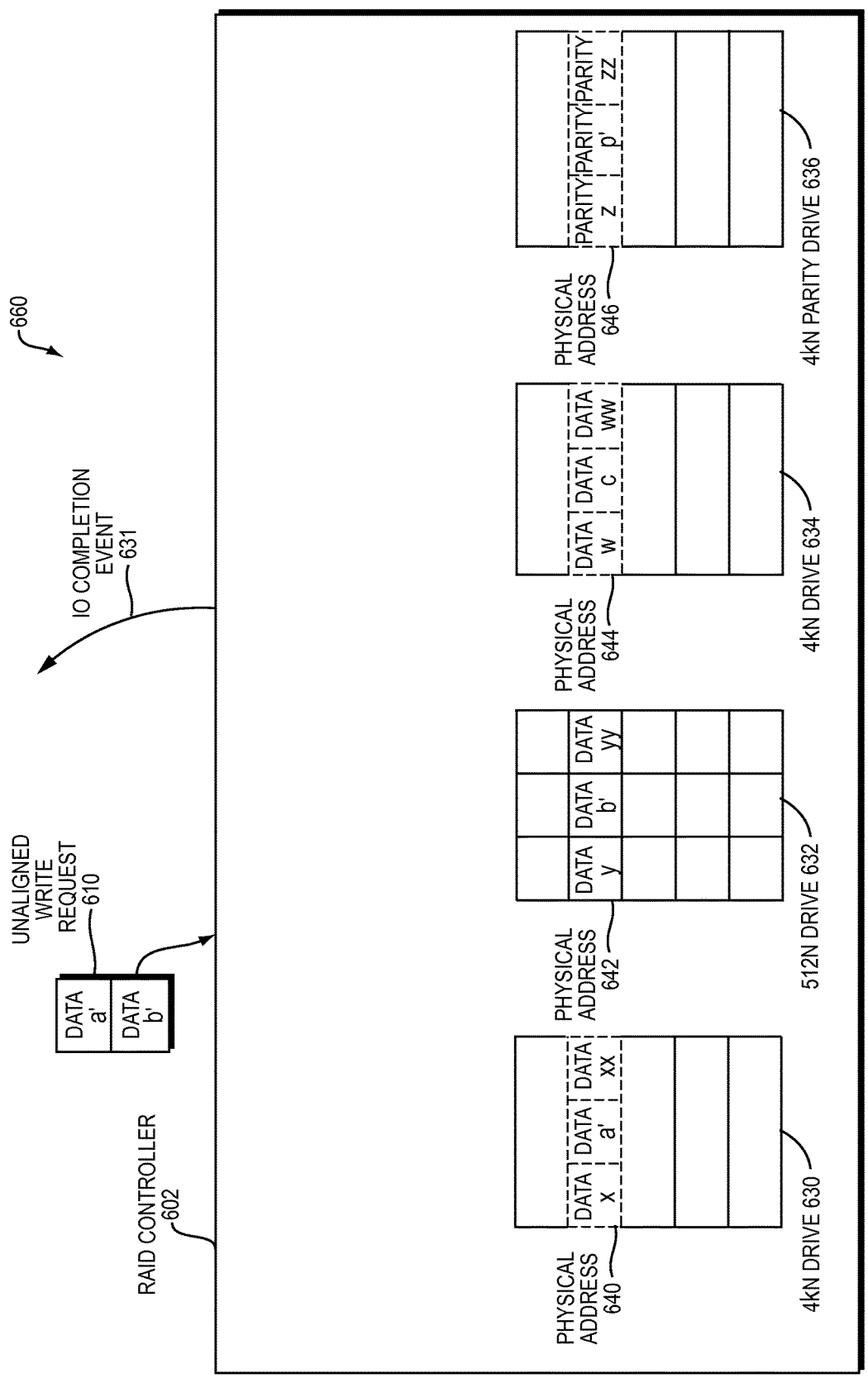
FIG. 6C is a block diagram illustrating an example embodiment of a parity RAID read-modify-write operation combined with an unaligned sector read-modify-write operation.

FIG. 6C is a block diagram 660 illustrating an example embodiment of an additive RAID read-modify-write operation combined with an unaligned sector read-modify-write operation. FIG. 6C is a logical continuation of the operation illustrated in FIGS. 6A-B. In relation to FIG. 6C, the RAID controller 602 generates a completion event 631 after the write operations of FIG. 6B. Data a' has replaced data a without modifying data x or data xx, data b' has replaced data b directly, and parity p' has replaced parity p without modifying parity z or parity zz. Therefore, the sector read-modify-write and the RAID read-modify-write were accomplished in one combined operation.

In an embodiment of the present invention, combining the sector read-modify-write with the RAID read-modify write is not just possible, but is always possible.

Figure 7A:
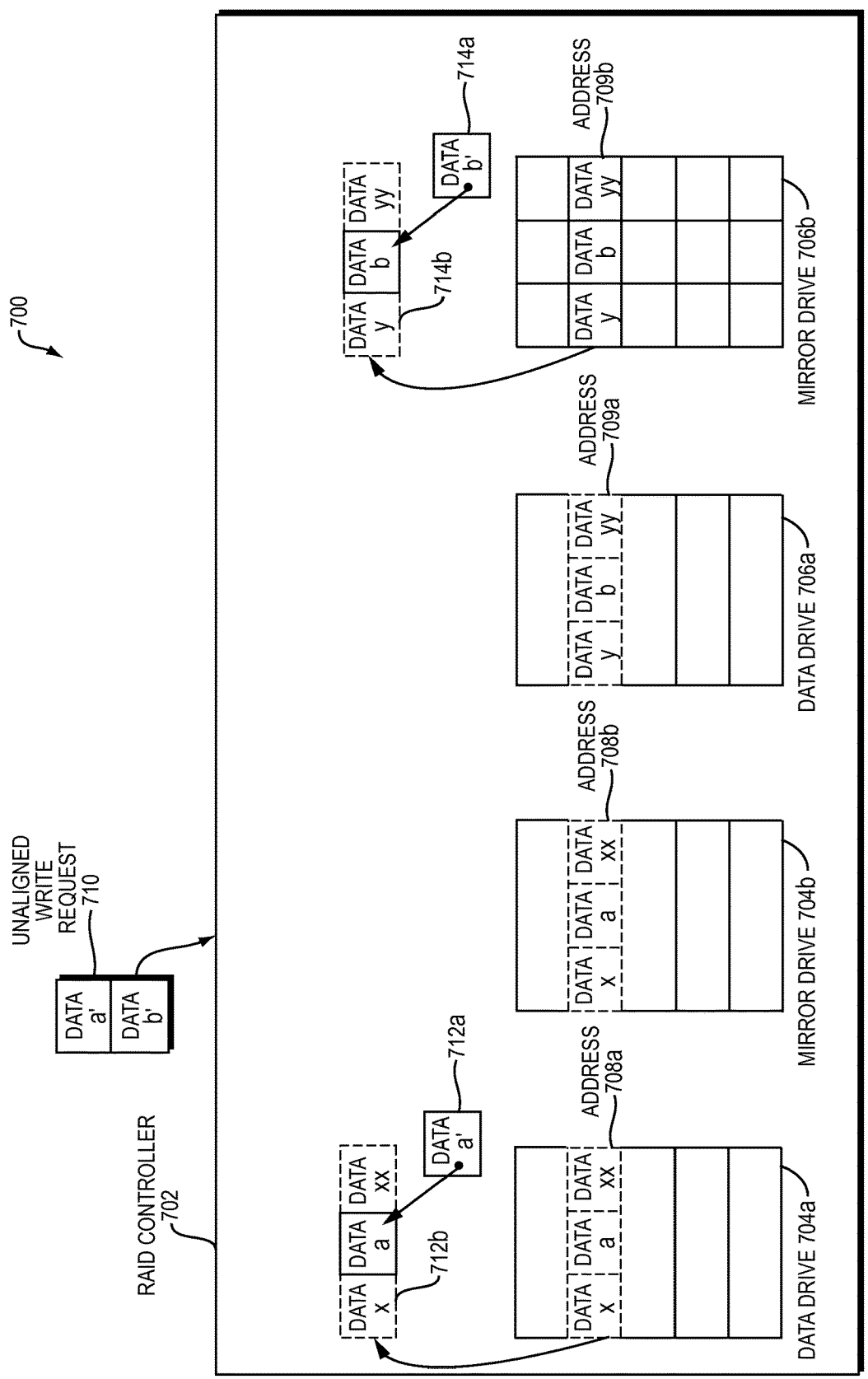
FIG. 7A is a block diagram illustrating an example embodiment of a mirrored RAID read-modify-write operation combined with an unaligned sector read-modify-write operation.

FIG. 7A is a block diagram 700 illustrating an example embodiment of a mirrored RAID read-modify-write operation combined with an unaligned sector read-modify-write operation. The RAID comprises a RAID controller 702, a mirrored pair comprising a 4 kN data drive 704a and a 4 kN mirror drive 704b, and a second mirrored pair comprising a 4 kN data drive 706a and a 512N mirror drive 706b, representing a RAID-10 configuration. A write request 710 is issued to controller 702, which accepts this request despite its misalignment with the physical sector boundary scheme of at least one of the drives 704a, 704b, 706a, or 706b. As in FIGS. 5-6, the RAID controller 702 determines that data a' belongs to drives 704a-b at physical addresses 708a-b, and separates it into buffer 712a. The RAID controller 702 also determines that data b' belongs to drive 706a-b at physical addresses 709a-b, and separates it into buffer 714a.

The RAID controller 702 determines a first physical sector boundary before the beginning of data a and a second physical sector boundary after the end of data a, and then pre-reads these sectors into buffer 712b because the location of data a is misaligned relative to the physical sector boundary scheme of drives 704a-b. The RAID controller 702 may choose either drive 704a or 704b from which to pre-read. The buffer 712b contains all of data a, along with data x and data xx, which are both not to be modified by the unaligned write request 710. In contrast, the location of data b is aligned relative to the physical sector boundary scheme of drive 706b, but is misaligned relative to the physical sector boundary scheme of drive 706a. Therefore, the RAID controller 702 determines, relative to drive 706a, a first physical sector boundary before the beginning of data b and a second physical sector boundary after the end of data b. It then pre-reads this region into buffer 714b, but the RAID controller 702 may choose to pre-read from either data drive 706a or mirror data drive 706b. In this illustration, the RAID controller 702 chooses to read from drive 706b even though there is no misalignment. Buffer 714b contains all of data b, along with data y and data yy, which are both not to be modified by unaligned write request 710. In theory, the RAID controller 702 may skip the reading of data b from drive 706b and read only data y and data yy, but in practice this is usually inefficient. When the pre-reads complete, the new data in buffer 712a overwrites the portion of buffer 712b corresponding to the actual beginning and ending locations of data a' in request 710, and the new data in buffer 714a overwrites the portion of buffer 714b corresponding to the actual beginning and ending locations of data b' in request 710.

Figure 7B:
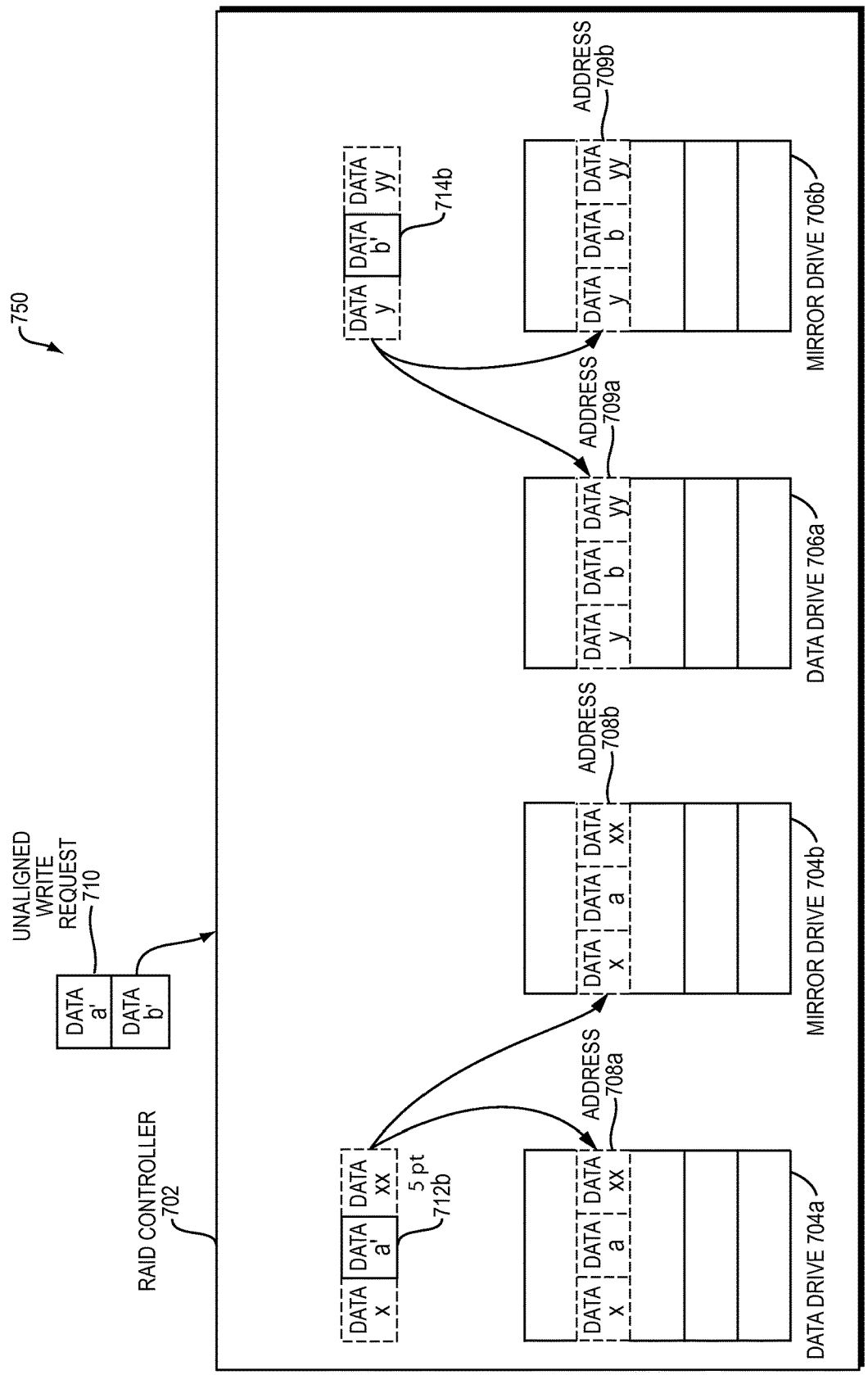
FIG. 7B is a block diagram illustrating the example embodiment of a mirrored RAID read-modify-write operation combined with an unaligned sector read-modify-write operation.

FIG. 7B is a block diagram 750 illustrating the example embodiment of a mirrored RAID read-modify-write operation combined with an unaligned sector read-modify-write operation. FIG. 7B is a logical continuation of the operation illustrated in FIG. 7A. In relation to FIG. 7B, the modified buffer 712b is written to drive 704a at physical address 708a, and also to drive 704b at physical address 708b. The modified buffer 714b is written to drive 706a at address 709a, and also to drive 706b at address 709b. Data a' replaces data a without modifying data x or data xx, and data b' replaces data b without modifying data y or data yy. Although this operation incurs a pre-read that mirrored RAID types typically do not incur, this method only requires pre-reading one drive in each mirror set. This is a significant improvement over 512e drive-based emulation, which incurs pre-reading on every drive in each mirror set. This mirroring method may be applied alongside or within other RAID types, including nested RAID types, replication methods, or drive cloning methods.

Figure 8:
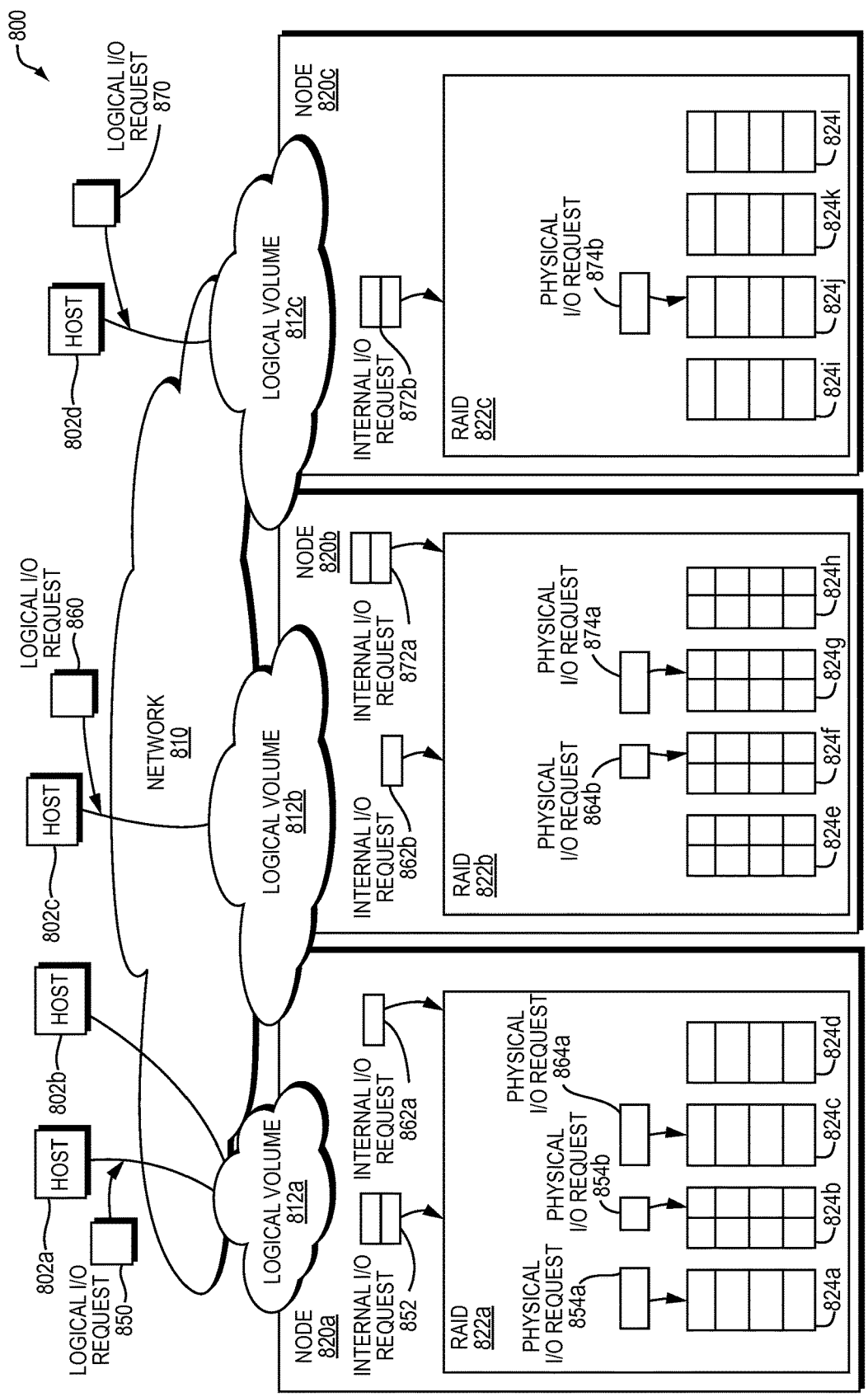
FIG. 8 is a block diagram illustrating an example embodiment of a storage system supporting a single internal sector boundary scheme and a plurality of logical and physical sector boundary schemes.

FIG. 8 is a block diagram 800 illustrating an example embodiment of a storage system supporting a single internal sector boundary scheme and a plurality of logical and physical sector boundary schemes. A group of nodes 820a-c provides logical volumes 812a-c over network 810 to hosts 802a-d. Each of the logical volumes 812a-c appear to a host as a single virtual drive, but in reality may be physically divided among any number of nodes. Accordingly, a logical volume 812a-c advertises a single logical sector boundary scheme, but in reality may be physically served by any number of nodes 820a-c with differing physical sector boundary schemes. FIG. 8 also illustrates the notion of an internal sector boundary scheme that does not differ among the nodes. This internal sector size is a common divisor of all supported logical sector sizes and all supported physical sector sizes. In a preferred embodiment, the internal sector size is 512 bytes, while the physical sector size may be any of 512 bytes or 4 k, and the logical sector size may be any of 512 bytes or 4 k.

Each node 820a-c contains a RAID controller 822a-c, respectively. Each of these RAID controllers can incorporate the methods and features of the respective RAID controllers 502, 602 and 702 of FIGS. 5A-C, 6A-C, and 7A-B, respectively. RAID controller 822a contains 4 kN drives 824a,c,d and 512N drive 824b. RAID controller 822b contains 512N drives 824e-h. RAID controller 822c contains 4 kN drives 824i-l.

Host 802a is connected to logical volume 812a, and issues a logical I/O request 850 to the logical volume 812a. By definition, the logical I/O request 850 is aligned relative to the logical sector boundary scheme of volume 812a (i.e., it comprises an integral number of logical sectors). When logical I/O request 850 arrives at node 820a, which is the only node serving logical volume 812a, it becomes internal I/O request 852. By definition, the internal I/O request 852 is aligned relative to the internal sector boundary scheme of the system, i.e., it comprises an integral number of internal sectors. This internal I/O request 852 is issued to the RAID controller 822a, which recognizes that the internal I/O request 852 is misaligned relative to the physical sector boundary schemes of at least one of the drives 824a-d, and performs the combined read-modify-write operation of FIGS. 5A-C, FIGS. 6A-C, or FIGS. 7A-B. Internal I/O request 852 is transformed into physical I/O request 854a, which is aligned relative to the physical sector boundary scheme of drive 824a, and physical I/O request 854b, which is aligned relative to the physical sector boundary scheme of drive 824b.

Host 802c is connected to logical volume 812b, and issues logical I/O request 860 to logical volume 812b. By definition, the logical I/O request 860 is aligned relative to the logical sector boundary scheme of volume 812b, i.e., it comprises an integral number of logical sectors. Some of these sectors belong to node 820a, and some belong to node 820b. Thus, logical I/O request 860 becomes internal I/O requests 862a (in node 820a) and 862b (in node 820b). By definition, both internal I/O requests 862a and 862b are aligned relative to the internal sector boundary scheme of the system, i.e., they comprise integral numbers of internal sectors. Internal I/O request 862a is issued to RAID controller 822a, which recognizes that the internal I/O request 862a is misaligned relative to the physical sector boundary schemes of at least one of the drives 824a-d, and performs the combined read-modify-write operation of FIGS. 5A-C, FIGS. 6A-C, or FIGS. 7A-B. In this way, the internal I/O request 862a is transformed into physical I/O request 864a, which is aligned relative to the physical sector boundary scheme of drive 824c. In contrast, the internal I/O request 862b is issued to RAID controller 822b, which recognizes that it is aligned relative to all of the drives 824e-h, and performs the ordinary read-modify-write operation of FIG. 2A or FIG. 2B. Internal I/O request 862b directly becomes physical I/O request 864b, being already aligned.

Host 802d is connected to logical volume 812c, and issues logical I/O request 870 to the logical volume 812. By definition, this I/O request is aligned relative to the logical sector boundary scheme of volume 812c, i.e., it comprises an integral number of logical sectors. Some of these sectors belong to node 820b, and some belong to node 820c. Thus, logical I/O request 870 becomes internal I/O requests 872a (on node 820b) and 872b (on node 820c). By definition, both 872a and 872b are aligned relative to the internal sector boundary scheme of the system, i.e., they comprise integral numbers of internal sectors. Internal I/O request 872a is issued to RAID controller 822b, which recognizes that it is aligned relative to all of the drives 824e-h, and performs the ordinary read-modify-write operation of FIGS. 2A and 2B. Internal I/O request 872a directly becomes physical I/O request 874a, being already aligned.

Internal I/O request 872b is issued to RAID controller 822c, which recognizes that the internal I/O request 872b is misaligned relative to all of the drives 824i-l, and performs the combined read-modify-write operation of FIGS. 5A-C, FIGS. 6A-C, or FIGS. 7A-B. In this way, internal I/O request 872b is transformed into physical I/O request 874b, which is aligned relative to the physical sector boundary scheme of drives 824i-l.

In another embodiment, logical I/O requests may be issued directly to a RAID, eliminating the need for a fixed internal sector boundary scheme that is a common divisor of all supported logical sector sizes and all supported physical sector sizes.

Figure 9:
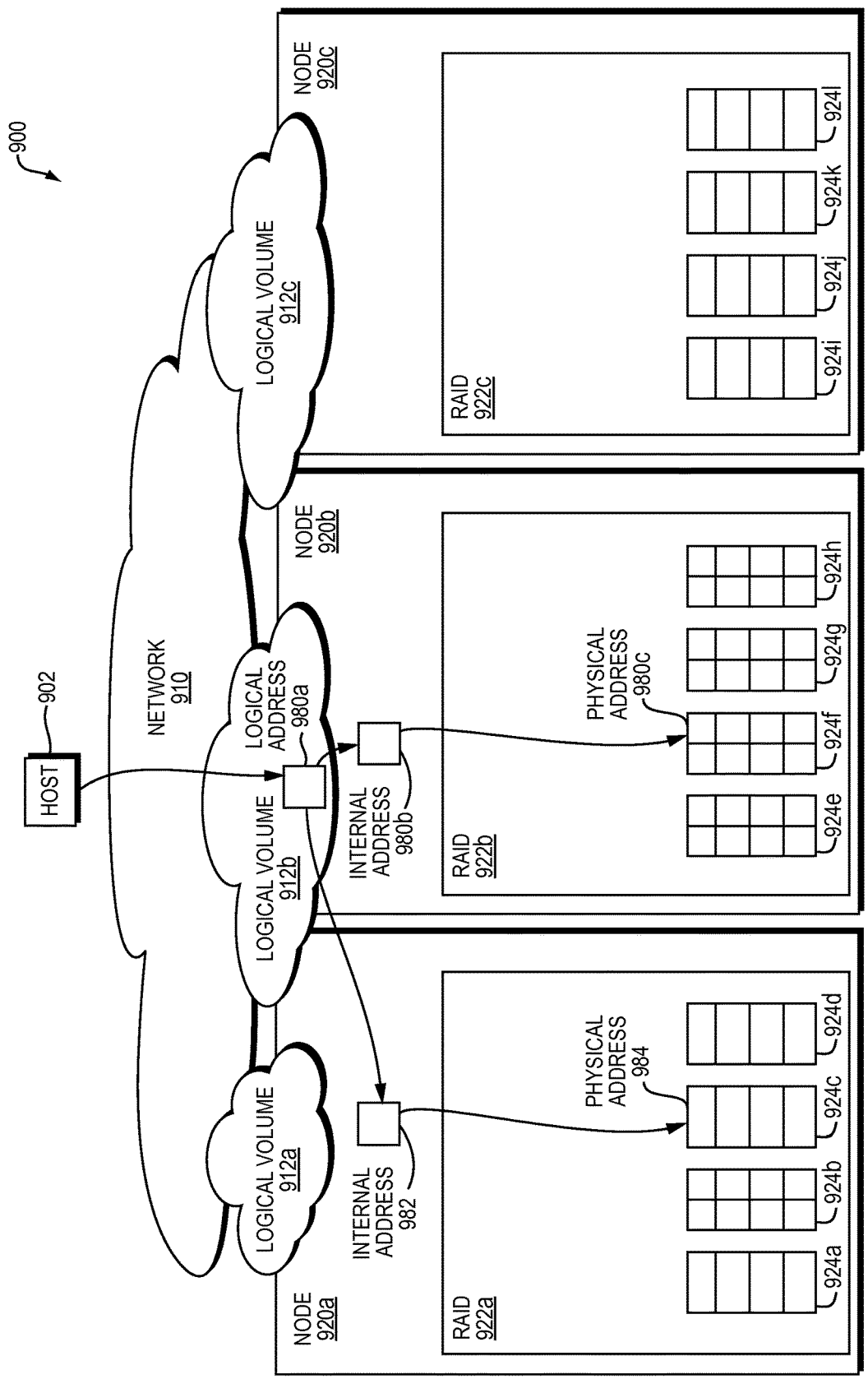
FIG. 9 is a block diagram illustrating an example embodiment of a storage system similar to FIG. 8.

FIG. 9 is a block diagram 900 illustrating an example embodiment of a storage system similar to FIG. 8. Logical address 980a in logical volume 912b maps to internal address 980b in node 920b, which in turn maps to physical address 980c in drive 924f in node 920b. These mappings may be changed dynamically, such that data at physical address 980c in drive 924f may be moved to physical address 984 in drive 924c on node 922a, with the mappings updated so that logical address 980a in logical volume 912b now maps to internal address 982 in node 920a, which in turn maps to physical address 984 in drive 924*c*. This process is transparent to the host 902, which continues to access logical address 980*a* and is agnostic to the underlying mappings. This remapping procedure is known in the art only when logical volume 912*b*, drive 924*f*, and drive 924*c* all share the same sector boundary scheme. According to the foregoing description, embodiments of the present invention allow the remapping procedure to occur even when the logical volume and physical drives all have different sector boundary schemes.

Figure 10:
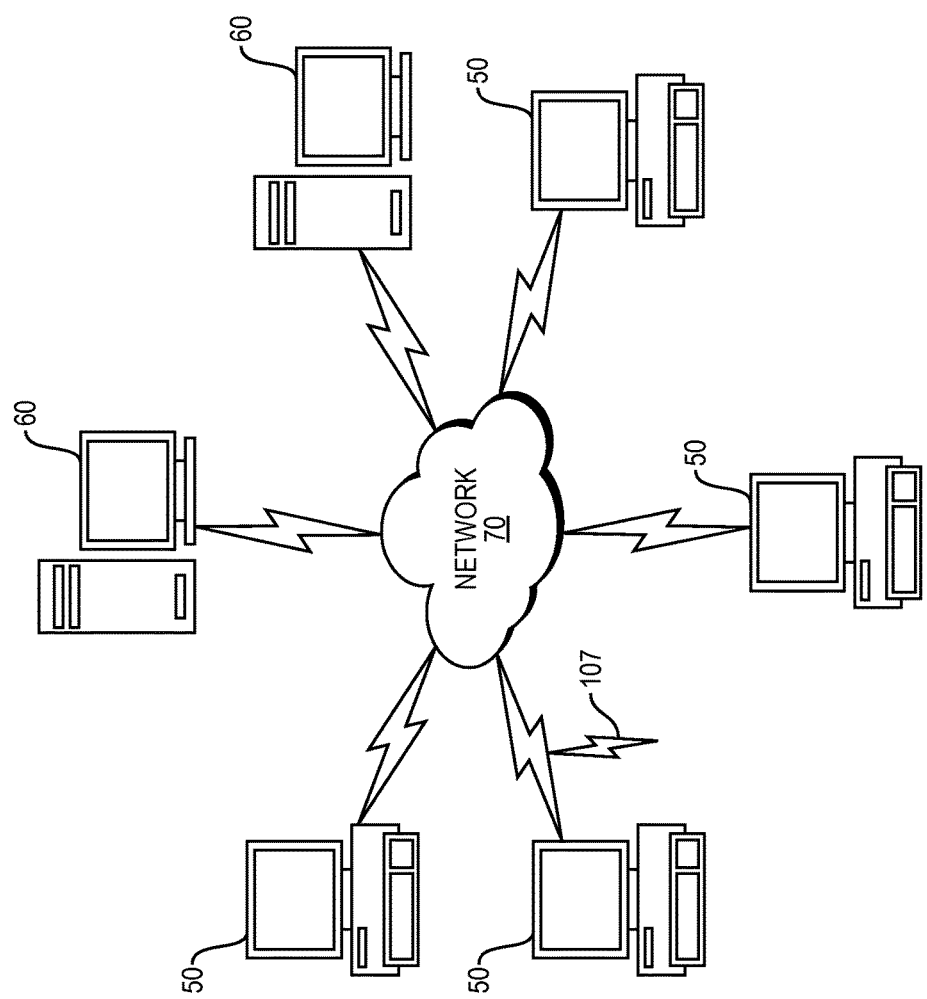
FIG. 10 illustrates a computer network or similar digital processing environment in which the present invention may be implemented.

FIG. 10 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 11:
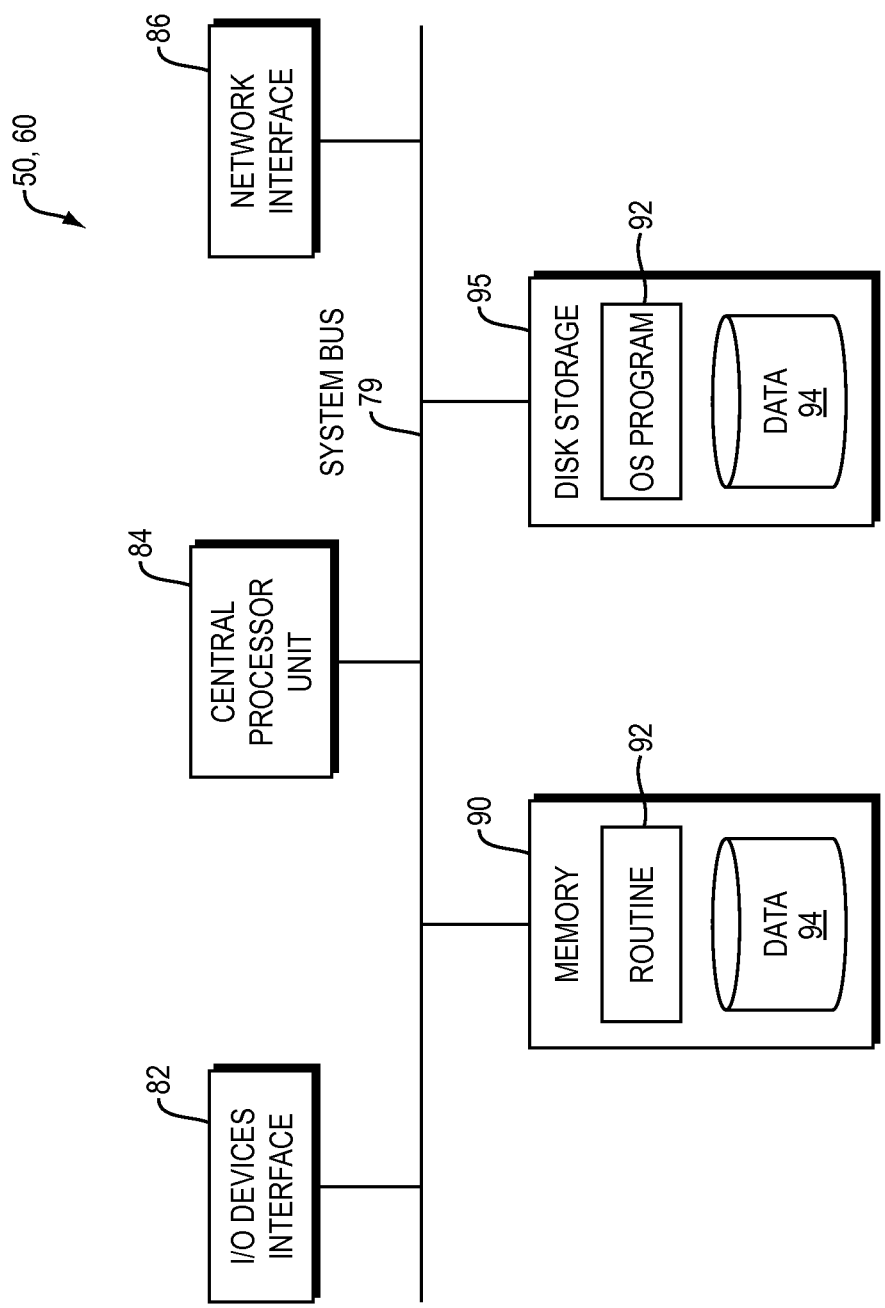
FIG. 11 is a diagram of the internal structure of a computer (e.g., client processor/device or server computers) in the computer system of FIG. 10.

FIG. 11 is a diagram of the internal structure of a computer (e.g., client processor/device 50 or server computers 60) in the computer system of FIG. 10. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 10). Memory 90 provides volatile storage for computer software instructions 92 and data 94 used to implement an embodiment of the present invention (e.g., unaligned I/O access code detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network (s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

What is claimed is:

1. A method comprising:
   responsive to receiving, from a host, a logical write request at a logical volume serviced by a plurality of nodes, each node having a redundant array of independent drives (RAID) with a plurality of drives, converting the logical write request to a local write request to a RAID of one of the nodes, the RAID including a first drive having a first physical sector boundary scheme and a second drive having a second physical sector boundary scheme, wherein a size of the first sector boundary scheme is larger than a size of the second physical sector boundary scheme, and wherein the logical write request has a logical sector boundary scheme of the second physical sector boundary scheme;
   responsive to the local write request to the RAID of one of the nodes, determining a single RAID operation to fulfill the local write request at the logical volume by determining a plurality of data items across the first drive and second drive including (a) a first sector on the first drive having a size of the first physical sector boundary; and (b) a second sector on the second drive having a size of the second physical sector boundary, wherein the first sector is separated into a data sector of the size of the second physical sector boundary and at least one buffer sector, each buffer sector having the size of the second physical sector boundary, such that a total size of the data sector and the at least one buffer sectors is the size of the first sector boundary scheme, wherein each data item comprises a data range on one of the plurality of drives, the single RAID operation comprising the steps of:
      pre-reading the plurality of data items, starting at a first physical sector boundary at or before a beginning location specified in each corresponding data range and ending at a second physical sector boundary at or after an ending location specified in each corresponding data range,
      performing at least one of:
         a modify operation to generate new parity or mirror data based on data from the local write request and data from the pre-reads,
         a modify operation to overlay data from the local write request onto the data from the pre-reads, and a modify operation to overlay data from the parity calculation onto data from the pre-reads, and writing any data item containing data from the local write request starting at the first physical sector boundary and ending at the second physical sector boundary at each of the two or more of the plurality of drives; and executing the single RAID operation to fulfill the local write request.

2. The method of claim 1, wherein the determined RAID operation can be at least one of an additive stripe update, a subtractive stripe update, and a mirrored stripe update.

3. The method of claim 1, wherein the determined RAID operation is a mirrored stripe update, pre-reading includes selecting one of the plurality of data items to read.

4. The method of claim 1, further comprising:
providing one or more logical volumes having one or more logical sector seizes;
wherein the drives in the RAID are capable of having different physical sector sizes.

5. The method of claim 4, wherein particular physical sector sizes of the drives in the RAID are at least one of 512 bytes and 4096 bytes, and particular virtualized sector sizes of the drives in the RAID are at least one of 512 bytes and 4096 bytes.

6. The method of claim 1, wherein an internal block boundary scheme represents a common divisor of all of the physical sector sizes and all of the logical sector sizes.

7. The method of claim 6, wherein the common divisor is the greatest common divisor.

8. The method of claim 4, wherein a logical volume is hosted on one or more nodes, each node with a corresponding RAID, the physical sector sizes in a first of the nodes being able to differ from the physical sector sizes in a second node, wherein at least one of the nodes includes the RAID with the plurality of drives.

9. The method of claim 1, further comprising:
moving data having a logical address that maps to a first physical address from the first drive to a second physical address on the second drive in the RAID; and
mapping the logical address of data to the second physical address on the second disk.

10. A system comprising:
a processor; and
a memory with computer code instructions stored therein, the memory operatively coupled to said processor such that the computer code instructions configure the processor to implement:
a request analysis module configured to:
responsive to receiving, from a host, a logical write request at a logical volume serviced by a plurality of nodes, each node having a redundant array of independent drives (RAID) with a plurality of drives, convert the logical write request to a local write request to a RAID of one of the nodes, the RAID including a first drive having a first physical sector boundary scheme and a second drive having a second physical sector boundary scheme, wherein a size of the first sector boundary scheme is larger than a size of the second physical sector boundary scheme, and wherein the logical write request has a logical sector boundary scheme of the second physical sector boundary scheme;
responsive to the local write request the RAID of one of the nodes, determine a single RAID operation to fulfill the local write request at a logical volume by determining a plurality of data items across the first drive and second drive including (a) a first sector on the first drive having a size of the first physical sector boundary; and (b) a second sector on the second drive having a size of the second physical sector boundary, wherein the first sector is separated into a data sector of the size of the second physical sector boundary and at least one buffer sector, each buffer sector having the size of the second physical sector boundary, such that a total size of the data sector and the at least one buffer sectors is the size of the first sector boundary scheme, wherein each data item comprises a data range on one of the plurality of drives, the single RAID operation comprising:
pre-reading the plurality of data items, starting at a first physical sector boundary at or before a beginning location specified in each corresponding data range and ending at a second physical sector boundary at or after an ending location specified in each corresponding data range;
performing at least one of:
a modify operation to generate new parity or mirror data based on data from the local write request and data from the pre-reads,
a modify operation to overlay data from the local write request onto the data from the pre-reads, and
a modify operation to overlay data from the parity calculation onto data from the pre-reads; and
writing any data item containing data from the local write request starting at the first physical sector boundary and ending at the second physical sector boundary at each of the two or more of the plurality of drives;
executing the single RAID operation to fulfill the local write requests.

11. The system of claim 10, wherein the determined RAID operation can be at least one of an additive stripe update, a subtractive stripe update, and a mirrored stripe update.

12. The system of claim 10, wherein the determined RAID operation is a mirrored stripe update, pre-reading includes selecting one of the plurality of data items to read.

13. The system of claim 10, further comprising:
a presentation module configured to provide one or more logical volumes having one or more logical sector seizes;
wherein the drives in the RAID are capable of having different physical sector sizes.

14. The system of claim 13, wherein particular physical sector sizes of the drives in the RAID are at least one of 512 bytes and 4096 bytes, and a particular virtualized block boundary scheme is at least one of 512 bytes and 4096 bytes.

15. The system of claim 10, wherein an internal block boundary scheme represents a common divisor of all of the physical sector sizes and all of the logical sector sizes.

16. The system of claim 15, wherein the common divisor is the greatest common divisor.

17. The system of claim 13, wherein a logical volume is hosted on one or more nodes, each node with a corresponding RAID, the physical sector sizes in a first of the nodes being able to differ from the physical sector sizes in a second node, wherein at least one of the nodes includes the RAID with the plurality of drives.

18. The system of claim 10, further comprising:
a data moving module configured to move data having a logical address that maps to a first physical address from the first drive to a second physical address on the second drive; and
a mapping module configured to map the logical address of data to the second physical address on the second disk.

19. A non-transitory computer-readable medium configured to store instructions for supporting input/output (I/O) requests to drives with different physical block sizes, the instructions, when loaded and executed by a processor, causes the processor to:
responsive to receiving, from a host, a logical write request at a logical volume serviced by a plurality of nodes, each node having a redundant array of independent drives (RAID) with a plurality of drives, convert the logical write request to a local write request to a RAID of one of the nodes, the RAID including a first drive having a first physical sector boundary scheme and a second drive having a second physical sector boundary scheme, wherein a size of the first sector boundary scheme is larger than a size of the second physical sector boundary scheme, and wherein the logical write request has a logical sector boundary scheme of the second physical sector boundary scheme;
responsive to the local write request to the RAID of one of the nodes, determine a single RAID operation to fulfill the local write request at a logical volume by determining a plurality of data items across the first drive and second drive including (a) a first sector on the first drive having a size of the first physical sector boundary; and (b) a second sector on the second drive having a size of the second physical sector boundary, wherein the first sector is separated into a data sector of the size of the second physical sector boundary and at least one buffer sector, each buffer sector having the size of the second physical sector boundary, such that a total size of the data sector and the at least one buffer sectors is the size of the first sector boundary scheme, wherein each data item comprises a data range on one of the plurality of drives, the single RAID operation comprising the steps of:
pre-reading the plurality of data items, starting at a first physical sector boundary at or before a beginning location specified in each corresponding data range and ending at a second physical sector boundary at or after an ending location specified in each corresponding data range,
performing at least one of a modify operation to generate new parity or mirror data based on data from the local write request and data from the pre-reads, a modify operation to overlay data from the local write request onto the data from the pre-reads, and a modify operation to overlay data from the parity calculation onto data from the pre-reads, and
writing any data item containing data from the local write request starting at the first physical sector boundary and ending at the second physical sector boundary at each of the two or more of the plurality of drives;
execute the single RAID operation to fulfill the local write requests;
wherein the plurality of drives are enabled to have one or a plurality of physical sector sizes.

20. The non-transitory computer-readable medium of claim 19, wherein the determined RAID operation can be at least one of an additive stripe update, a subtractive stripe update, and a mirrored stripe update.

* * * * *